(12) United States Patent
Ohzeki et al.

(10) Patent No.: US 8,703,239 B2
(45) Date of Patent: Apr. 22, 2014

(54) IMAGE FORMING METHOD

(75) Inventors: Tomoyuki Ohzeki, Kanagawa (JP); Yoshimitsu Arai, Kanagawa (JP); Kaoru Tojo, Kanagawa (JP); Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 827 days.

(21) Appl. No.: 12/548,461

(22) Filed: Aug. 27, 2009

(65) Prior Publication Data

US 2010/0068389 A1 Mar. 18, 2010

(30) Foreign Application Priority Data

Sep. 16, 2008 (JP) ................... 2008-236834

(51) Int. Cl.
*B05D 5/00* (2006.01)
*B05D 1/32* (2006.01)
*C08J 7/04* (2006.01)

(52) U.S. Cl.
USPC ............................ 427/256; 427/466; 427/504

(58) Field of Classification Search
None
See application file for complete search history.

(56) References Cited

U.S. PATENT DOCUMENTS

| | | | | |
|---|---|---|---|---|
| 6,379,443 | B1 * | 4/2002 | Komatsu et al. | 106/31.58 |
| 7,083,668 | B2 * | 8/2006 | Taguchi et al. | 106/31.46 |
| 2004/0104963 | A1 * | 6/2004 | Nakazawa | 347/34 |
| 2004/0229974 | A1 * | 11/2004 | Miyabayashi | 523/160 |
| 2005/0004261 | A1 | 1/2005 | Yatake | |
| 2005/0176847 | A1 * | 8/2005 | Cagle | 523/160 |
| 2007/0076075 | A1 * | 4/2007 | Schmid et al. | 347/102 |
| 2007/0146454 | A1 * | 6/2007 | Doi et al. | 347/100 |
| 2007/0155856 | A1 * | 7/2007 | Kee et al. | 523/160 |
| 2007/0229577 | A1 | 10/2007 | Morimoto | |
| 2008/0146729 | A1 | 6/2008 | Yatake | |
| 2008/0252709 | A1 * | 10/2008 | Ushiku | 347/102 |
| 2009/0202723 | A1 * | 8/2009 | Ikoshi et al. | 427/256 |

FOREIGN PATENT DOCUMENTS

| | | | |
|---|---|---|---|
| EP | 1561788 A1 | 8/2005 | |
| JP | 2005-272790 | 10/2005 | |
| JP | 2007-154133 A | 6/2007 | |
| JP | 2007-160839 A | 6/2007 | |
| JP | 2007-261206 A | 10/2007 | |
| JP | 2007-262413 A | 10/2007 | |
| WO | WO 2006/095794 | * 9/2006 | C09D 11/00 |
| WO | 2007/040746 A | 4/2007 | |

OTHER PUBLICATIONS

Partial English language translation of the following: Office action dated Feb. 26, 2012 from the Japanese Patent Office in a Japanese patent application corresponding to the instant application. This office action translation is submitted now in order to supplement the understanding of patent document JP 2008-236834 which is cited in the office action and is being disclosed in the instant Information Disclosure Statement.

* cited by examiner

*Primary Examiner* — Timothy Meeks
*Assistant Examiner* — Ina Agaj
(74) *Attorney, Agent, or Firm* — SOLARIS Intellectual Property Group, PLLC

(57) ABSTRACT

The invention provides an image forming method having at least: applying, onto a recording medium, an ink composition containing at least a water-soluble organic solvent, a pigment, a polymer particle and water; and removing at least a part of the water-soluble organic solvent from the ink composition on the recording medium. The water-soluble organic solvent contains at least a water-soluble organic solvent having a vapor pressure of less than 10 Pa at 20° C., a boiling temperature of less than 260° C., and an SP value of less than 25, at a content of 30 mass % or more with respect to the total water-soluble organic solvent content of the ink composition.

11 Claims, No Drawings

IMAGE FORMING METHOD

CROSS-REFERENCE TO RELATED APPLICATION

This application claims priority under 35 USC 119 from Japanese Patent Application No. 2008-236834 filed on Sep. 16, 2008, the disclosure of which is incorporated by reference herein.

BACKGROUND OF THE INVENTION

1. Field of Invention

The invention relates to an image forming method.

2. Description of the Related Art

Many methods have been proposed in recent years as an image recording method of recording a color image. Demands with respect to quality of recorded materials, such as image quality, texture, or curling after recording are high for all of such methods.

Inkjet technology has been applied in fields such as office printers and home printers, and is being applied in the field of commercial printing in recent years. Various techniques for recording mediums for inkjet recording and inks used therein have been examined for obtaining recorded materials having high quality in terms of color density, fixability, resolution, curling property after recording and the like.

There are a wide variety of recording mediums, such as plain paper, to which the inkjet method is employed for recording. There are cases where satisfactory image quality cannot be obtained or curling of a recorded medium occurs.

In connection with the foregoing, a method including applying an ink for inkjet recording onto a recording medium and heating the recorded medium has been proposed as a technique for improving the rubbing resistance of images, in which the ink for inkjet recording contains a volatile solvent having a boiling temperature of 285° C. or less, polymer particles having an acidic functional group, and a pigment having a polymer adhered thereto (see, for example, European Patent No. 1561788).

SUMMARY

When such volatile solvent is used, the rubbing resistance of images may tend to be improved. However, depending on the type or amount of the remaining solvent, curling may occur after recording. Further, because of the volatility of the solvent, the stability of the ink is low, the drying and solidification of the ink in nozzles may easily proceed, and the ink is hardly re-dispersible after solidification and is thus inferior in removability (maintainability).

Further, when a volatile solvent having a high solubility parameter (SP) value is used, curling after recording may be decreased at ordinary temperature and ordinary pressure, but curling at high temperature and high humidity may not be ameliorated.

The present invention is made in view of the circumstances. The present invention is directed to an image recording method capable of maintaining the stability and suitability to jetting of ink, suppressing curling after recording, and recording an image excellent in rubbing resistance.

Namely, one aspect of the invention provides an image forming method comprising: applying, onto a recording medium, an ink composition comprising a water-soluble organic solvent, a pigment, a polymer particle and water; and removing at least a part of the water-soluble organic solvent from the ink composition on the recording medium, the water-soluble organic solvent comprising a water-soluble organic solvent having a vapor pressure of less than 10 Pa at 20° C., a boiling temperature of less than 260° C., and an SP value of less than 25, at a content of 30 mass % or more with respect to the total water-soluble organic solvent content of the ink composition.

DETAILED DESCRIPTION

The image forming method of the invention includes at least applying an ink composition onto a recording medium and removing at least a part of a water-soluble organic solvent from the ink composition on the recording medium, in which the ink composition contains at least the water-soluble organic solvent, a pigment, a polymer particle and water, and the water-soluble organic solvent contains at least a water-soluble organic solvent having a vapor pressure of less than 10 Pa at 20° C., a boiling temperature of less than 260° C., and an SP value of less than 25, at a content of 30 mass % or more with respect to the total water-soluble organic solvent content of the ink composition.

The image forming method of the invention uses an ink composition for image recording which contains a water-soluble organic solvent having a vapor pressure of less than 10 Pa at 20° C., a boiling temperature of less than 260° C., and an SP value of less than 25, together with polymer particles, and performs removal of the water-soluble organic solvent after recording. The ink composition at or before the recording may thereby be kept in a state less liable to drying, but may effectively proceed drying when the drying is promoted by heat or the like. Accordingly, the image forming method of the invention may maintain stability and jetting suitability of ink, may suppress occurrence of curling not only at ordinary temperatures and ordinary humidity but also at high temperature and high humidity, may attain removability (maintainability) of residual ink adhering to the surface of a nozzle, and may enable recording of rub-resistant high-quality images.

Hereinafter, the processes included in the inkjet recording method of the invention will be described.

Application of Ink

In this applying of the ink composition, an ink composition containing at least (a) a water-soluble organic solvent having, at 20° C., a vapor pressure of less than 10 Pa, a boiling temperature of less than 260° C. and a solubility parameter of less than 25, (b) a pigment, (c) polymer particles, and (d) water, wherein the proportion of the water-soluble organic solvent (a) with respect to the total content of water-soluble organic solvent(s) of the ink composition is 30% by mass or more, is applied to a recording medium. Herein, the ink composition can be selectively applied to a recording medium to form a desired visible image.

Examples of the liquid application method include application of ink using common writing materials, application of ink using a pen plotter, and application of ink by an ink jet method. From the viewpoint of high-speed recordability, the application of the ink composition is preferably performed by an inkjet method.

Inkjet recording method which can be employed in the invention may include imparting energy to an inkjet recording ink (ink composition) to eject the ink to form an image on a desired image receiving material such as plain paper, resin coated paper, inkjet paper such as those described in JP-A-Nos. 8-169172, 8-27693, 2-276670, 7-276789, 9-323475, 62-238783, 10-153989, 10-217473, 10-235995, 10-217597 or 10-337947, a film, electrophotographic common paper, fabrics, glass, metal or ceramics. In embodiments, the inkjet recording method described in the paragraphs 0093 to 0105 of JP-A No. 2003-306623 can be employed as a preferable inkjet recording method in to the invention.

There is no particular limitation on the ink jet method in the invention. Any known method, such as an electrical charge control method in which an ink is jetted utilizing electrostatic attraction force, a drop-on-demand method (pressure pulse method) utilizing vibration pressure of a piezo-electric element, an acoustic ink jet method including changing an electrical signal into an acoustic beam, irradiating an ink with the acoustic beam, and jetting the ink utilizing radiation pressure, or a thermal ink jet (BUBBLE JET®) method including heating an ink to form bubbles and utilizing pressure generated therefrom, may be employed. Specifically, in embodiments, an ink jet method including jetting an ink from a nozzle by working force caused by a state change, which is a drastic change in volume of the ink occurring when thermal energy action is applied thereto, as described in JP-A 54-59936, can be effectively used The scope of the ink jet method includes: a method including jetting a large number of small volume-droplets of ink with low concentration, referred to as a photo ink; a method including using a plurality of inks that have substantially same hue and different concentration in view of improving image quality; a method including using a colorless transparent ink; and the like.

An ink jet head used in the ink jet method may be an on-demand type or a continuous type. Specific examples of a jetting system employed in the ink jet method include an electricity-machine conversion (such as a single cavity type, a double cavity type, a bender type, a piston type, a share mode type, or a shared wall type), an electricity-heat conversion (such as a thermal ink jet type or a BUBBLE JET® type), an electrostatic suction (such as an electric field control type or a slit jet type), and an electric jetting (such as a spark jet type), and any jetting method may be used.

An ink nozzle or the like to be used when recording is performed by the ink jet method is not particularly limited, and can be suitably selected according to the purpose.

The ink jet head can be a shuttle head, which performs recording using a short serial head while scanning the head in the width direction of a recording medium, or a line head, which employs recording elements arranged corresponding to the entire region of one side of the recording medium. When the line head is used, image recording can be performed on the entire surface of the recording medium by scanning the recording medium in the direction orthogonal to the arrangement direction of the recording elements, and a transporting system such as a carriage that scans the short head is unnecessary. Further, complicated regulation of the movement of a carriage and a recording medium for scanning is unnecessary, and only the recording medium moves. Thus, a higher recording rate than that achieved by using the shuttle head can be achieved by using the line head. The ink jet recording method of one aspect of the invention can be applied to recording employing any of the above heads, but in general, improvements in precision of ink jetting and rubbing resistance can be more remarkable when applied to recording employing the line head in which dummy jetting is not performed.

Ink Composition

The ink composition of the invention contains at least (a) a water-soluble organic solvent having a vapor pressure of less than 10 Pa at 20° C., a boiling temperature of less than 260° C., and an SP value of less than 25, (b) a pigment, (c) a polymer particle, and (d) water, and may further contain other components if necessary.

(a) Water-Soluble Organic Solvent

The ink composition used in the invention contains at least one water-soluble organic solvent having a vapor pressure of less than 10 Pa at 20° C., a boiling temperature of less than 260° C., and a solubility parameter (SP value) of less than 25 (also referred to hereinafter as "the specific organic solvent in the invention" or "the specific organic solvent"). The inclusion of the specific organic solvent may facilitate suppressing curling of a medium recorded therewith under a wide range of humidity in various environments and well keeping the stability and chargeability of the ink.

The boiling temperature of the specific organic solvent is less than 260° C. When the boiling temperature is a high temperature of 260° C. or more, the organic solvent may not be sufficiently removed in an organic solvent-removing process performed after the applying of the ink, which may lead to occurrence of curling. From the same viewpoint, the boiling temperature of the specific organic solvent is preferably 100° C. to 260° C., and more preferably 150° C. to 250° C. From the viewpoint of jetting stability, the boiling temperature of the ink is preferably not too low. When the boiling temperature is 100° C. or more, the jetting failure of the ink caused by drying of ink may be inhibited so as to keep jetting stability better.

The vapor pressure (at 20° C.) of the specific organic solvent is less than 10 Pa. When the vapor pressure is 10 Pa or more, the ink composition even at room temperature is easily dried to cause jetting failure. From the same viewpoint, the vapor pressure of the specific organic solvent at 20° C. in the invention is preferably 0.1 Pa to 10 Pa, more preferably 0.2 Pa to 8 Pa. From the viewpoint of suppressing curling, the vapor pressure of the ink composition is preferably not too low. When the vapor pressure (at 20° C.) is 0.1 Pa or more, the organic solvent can be sufficiently removed in the step of removing the solvent by heating or the like, and curling can be suppressed.

In the invention, the specific organic solvent preferably has the boiling temperature of 150° C. to 255° C. and the vapor pressure at 20° C. of 0.1 Pa to 8 Pa, and more preferably has the boiling temperature of 200° C. to 250° C. and the vapor pressure at 20° C. of 0.2 Pa to 7 Pa.

Further, when the SP value (solubility parameter) of the water-soluble organic solvent contained in the ink composition is made less than 25, curling after recording can be effectively suppressed.

The solubility parameter (SP value) of a water-soluble organic solvent as used in the invention is a value expressed by the square root of cohesive energy of molecules. SP values can be calculated by the method described in R. F. Fedors, *Polymer Engineering Science*, 14, pp. 147 (1967), the disclosure of which is incorporated by reference herein.

When the SP value of the specific organic solvent in the invention is 25 or more, the curling suppressing effect may not be achieved even when the specific organic solvent is contained in the range of 30% by mass or more with respect to the total water-soluble organic solvent. The SP value of the specific organic solvent in the invention is preferably 24.5 or less, more preferably in the range of 17 to 24, from the viewpoint of the curling suppressing effect.

The ink composition of the invention contains the specific organic solvent defined in the invention in the range of 30% by mass or more with respect to the total amount (mass) of the water-soluble organic solvent. When the content of the specific organic solvent in the invention is less than 30% by mass, the content of a solvent having an SP value higher than the SP value of the specific organic solvent is so large that the occurrence and/or the degree of curling may be increased under a wide range of humidity in various environments after recording, and rubbing resistance may be deteriorated.

Preferable examples of the specific organic solvent employed in the invention include a monoalkylether compound of polyalkylene glycol, and more preferable examples include a monoalkylether compound of polyalkylene glycol in which the alkyl moiety has 1 to 6 carbon atoms and the alkylene moiety has 1 to 12 carbon atoms, and further preferable examples include monoalkylether compounds of at least one member selected from diethylene glycol, triethylene glycol, dipropylene glycol, and tripropylene glycol in which the alkyl moiety has 1 to 4 carbon atoms.

Specific examples of the specific organic solvent in the invention include diethylene glycol monobutyl ether (boiling temperature: 230° C., SP value: 21.2, vapor pressure at 20° C.: 3 Pa), triethylene glycol monomethyl ether (boiling temperature: 246° C., SP value: 22.1, vapor pressure at 20° C.: 1.33 Pa), triethylene glycol monoethyl ether (boiling temperature: 255° C., SP value: 21.7, vapor pressure at 20° C.: 0.3 Pa), and tripropylene glycol monomethyl ether (boiling temperature: 243° C., SP value: 20.4, vapor pressure at 20° C.: 4 Pa).

The specific organic solvent in the invention may be used singly or as a mixture of two or more thereof.

The ink composition employed in the invention may contain, in addition to the specific water-soluble organic solvent, other organic non-volatile solvent.

Examples of the non-volatile solvent include the following compounds, although the scope of the invention is not limited by these. The number in the parenthesis attached to the respective compound denotes the SP value of the compound.

Triethyleneglycol monobutylether (21.1)

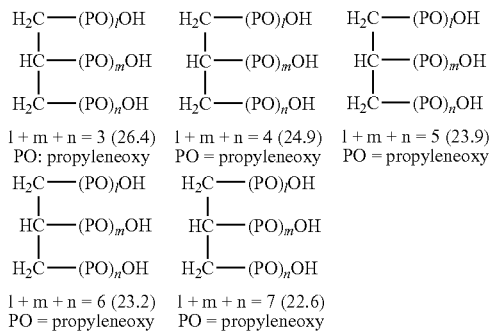

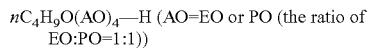
(20.1)

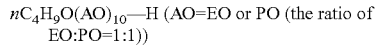
(18.8)

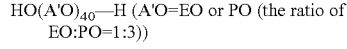
(18.7)

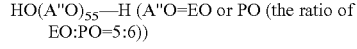
(18.8)

(24.7)

(21.2)

In the above formulae, EO represents an ethyleneoxy group, and PO represents a propyleneoxy group.

These may be used singly or as a mixture of two or more thereof.

The total content of one or more non-volatile water-soluble organic solvents having an SP value of less than 27.5 is preferably 70 mass % or more, and more preferably 90 mass % or more with respect to the total content of the non-volatile water-soluble organic solvent(s) in the ink composition, from the viewpoint of inhibition of curling.

A solvent which is different from the non-volatile water-soluble organic solvent may be further employed as long as the effect of the invention is not impaired thereby.

Examples of a water-soluble organic solvent which can be additionally used as such other solvent include polyhydric alcohols including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; so-called solid wetting agents including saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; and ureas; alkyl alcohols having 1 to 4 carbon atoms such as ethanol, methanol, butanol, propanol or isopropanol;

glycol ethers such as ethyleneglycol monomethyl ether, ethyleneglycol monoethyl ether, ethyleneglycol monobutyl ether, ethyleneglycol monomethyl ether acetate, diethyleneglycol monomethyl ether, diethyleneglycol monoethyl ether, diethyleneglycol mono-n-propyl ether, ethyleneglycol mono-iso-propyl ether, diethyleneglycol mono-iso-propyl ether, ethyleneglycol mono-n-butyl ether, ethyleneglycol mono-t-butyl ether, diethyleneglycol mono-t-butyl ether, 1-methyl-1-methoxybutanol, propyleneglycol monomethyl ether, propyleneglycol monoethyl ether, propyleneglycol mono-t-butyl ether, propyleneglycol mono-n-propyl ether, propyleneglycol mono-iso-propyl ether, dipropyleneglycol monomethyl ether, dipropyleneglycol monoethyl ether, dipropyleneglycol mono-n-propyl ether or dipropyleneglycol mono-iso-propyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. One or more among these solvents may be employed as the other solvent.

A polyhydric alcohol can be preferably employed as an anti-drying agent and/or a wetting agent. Examples of the polyhydric alcohol include glycerin, ethyleneglycol, diethyleneglycol, triethyleneglycol, propyleneglycol, dipropyleneglycol, tripropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. One or more among these solvents may be employed as the other solvent.

A polyol compound can be preferably employed as a penetrating agent. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, or 2,2,4-trimethyl-1,3-pentanediol. Among these compounds, 2-ethyl-1,3-hexanediol and 2,2,4-trimethyl-1,3-pentanediol are preferable. One or more among these solvents may be employed as the other solvent.

A content of the non-volatile organic solvent contained in the ink composition employed in the invention is preferably in a range of 5 mass % to 30 mass %, and more preferably 5 mass % to 25 mass %, with respect to the total amount of the ink composition. When the content of the non-volatile water-soluble organic solvent in the water-soluble organic solvent is 5 mass % or more, the re-dispersibility of solid substance derived from the ink composition can be more favorable. When the content is adjusted to 30 mass % or lower, the stability of the ink composition can be further increased.

When the ink composition contains the non-volatile water-soluble organic solvent, the total content of one or more non-volatile water-soluble organic solvents having an SP value of less than 27.5 is preferably 90% by mass or more with respect to the total content of the non-volatile water-soluble organic solvent. When the SP value of the non-volatile water-soluble organic solvent is less than 27.5, curling after printing can be suppressed. When the proportion of the non-volatile water-soluble organic solvent having an SP value of less than 27.5 is 90% by mass or more with respect to the total amount of the non-volatile water-soluble organic solvent, curling after recording can be more effectively suppressed.

The ratio (a/b) of the non-volatile water-soluble organic solvent (a) to the specific organic solvent (b) in terms of mass is preferably in the range of 70/30 to 10/90, and more preferably 68/32 to 20/80.

The non-volatile water-soluble organic solvent may be used singly or as a mixture of two or more thereof.

The content of the water-soluble organic solvent, which is the total content including the content of the specific organic solvent, in the ink composition is preferably from 1 mass % to 60 mass %, and more preferably from 5 mass % to 40 mass %, with respect to the total amount of the ink composition. From the viewpoint of suppressing the curling of the recorded medium, the content of the water-soluble organic solvent is particularly preferably from 10 mass % to 30 mass % with respect to the total amount of the ink composition.

(b) Pigment

The ink composition employed in the invention contains at least one pigment.

The pigment may be either an organic pigment or an inorganic pigment, or both of these can be used in combination.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinofraron pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Specific examples of a carbon black, which is a black pigment, include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 and RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names, manufactured by Degussa); and No. 25, No. 33, No. 40, No. 45, No. 47, No. 52, No. 900, No. 2200B, No. 2300, MCF-88, MA600, MA7, MA8 and MA100 (trade names, manufactured by Mitsubishi Chemical Corporation), although the black pigment employable in the invention is not limited thereto.

Organic pigments usable in the invention include yellow ink pigments such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmiumred), 112, 114, 122 (quinacridonemagenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C. I. Pigment Blue 15:3 is particularly preferable.

The pigment may be used singly or in combination of two or more thereof, each of which may be selected from the above classes of pigments and may belong to the same class as each other or different classes from each other.

Water-Dispersible Pigment

The pigment, which is employed as a colorant in the ink composition, is preferably covered with a pigment dispersant (preferably a water-insoluble resin) and dispersed in water. When the pigment is employed in this condition, the pigment may be present as a very fine particulate and may be highly stably dispersed. Herein, the surface of the pigment particle is not necessarily completely covered with the pigment dispersant, and may be covered at at least one portion thereof.

Examples of the pigment used in the invention which are preferable from the viewpoint of the stability and ejection stability of the ink composition include water-dispersible pigment such as (1) an encapsulated pigment, (2) a self-dispersible pigment, (3) a resin dispersed pigment, or (4) a surfactant-dispersed pigment.

The encapsulated pigment (1) is a polymer emulsion formed by incorporating a pigment into polymer particles. More specifically, in the encapsulated pigment, pigment particles respectively have a resin layer formed of a hydrophilic water-insoluble resin which covers the surface of the pigment particle and imparts hydrophilicity to the pigment particle by its presence so that the pigment particles are dispersed in water. The encapsulated pigment can be formed by, for example, by phase inversion emulsification.

The self-dispersible pigment (2) is a pigment having at least one hydrophilic group on a surface thereof and exhibiting at least one of water-dispersibility or water-solubility in the absence of a dispersant. More specifically, the pigment is prepared by subjecting the surfaces of pigment particles (such as carbon black particles) to an oxidizing treatment so as to impart hydrophilicity to the pigment particles and so as to enable the pigment itself to disperse in water.

Theresin dispersed pigment (3) is a pigment dispersed using a water-soluble polymer compound having a weight average molecular weight of 50,000 or less.

The surfactant-dispersed pigment (4) is a pigment dispersed using a surfactant.

Among these pigments, the encapsulated pigment (1) and the self-dispersible pigment (2) are preferable, and the encapsulated pigment (1) is particularly preferable.

Encapsulated Pigment

The resin used in the encapsulated pigment is not specifically limited, although it is preferably a polymer compound that is self-dispersible or dissolvable in a mixed solvent of water and a water-soluble organic solvent and that has an anionic (acidic) group. In general, the number average molecular weight of the resin is preferably in the range of about 1,000 to about 100,000, and particularly preferably in the range of about 3,000 to about 50,000. The resin is preferably a resin that can dissolve in an organic solvent to form a solution. When the number average molecular weight of a resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers and mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

Specific examples of the method of forming the encapsulated pigment include the phase inversion emulsification method and the acid precipitation method shown in JP-A Nos. 9-151342 and 10-14006, and among these, the phase-inversion emulsification method is preferable in view of dispersion stability. Details of the phase-inversion emulsification method and the acid precipitation method are explained below.

A self-dispersible pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the expression "can be dispersed in an aqueous medium without a dispersant", indicates a state in which the pigment particles are dispersible in the aqueous medium even when a dispersant for dispersing the pigment is not used.

An ink composition containing a self-dispersible pigment as a colorant does not need to contain a dispersant, which is otherwise contained for dispersing a usual pigment. Therefore, the ink containing a self-dispersible pigment can be free from decrease in defoaming property due to a dispersant, and generation of foam is hardly observed in the ink composition containing a self-dispersible pigment. Accordingly, an ink composition with excellent ink ejection stability can be easily prepared by employing a self-dispersible pigment.

The pigment in the invention is preferably a encapsulated pigment, at least a part of the surface of which is covered with a water-insoluble resin used as a pigment dispersant. Examples thereof include a polymer emulsion of a pigment contained in water-insoluble resin particles, which is more preferably a pigment having a surface, at least a part of which is covered with a water-insoluble resin to form a resin layer on the surface so as to make the pigment be dispersible in water.

Details of the phase-inversion emulsification method and the acid precipitation method are explained below.

a) Phase-Inversion Emulsification Method

The phase-inversion method is a self-dispersing method, which may basically include dispersing a mixture of a pigment and a water-soluble or self-dispersing resin in water, in which the "mixture" refers to a state in which the components in an undissolved state are mixed, or a state in which the components are dissolved and mixed, or a state including both of the above states, and may contain the curing agent or the polymer compound. Specific examples of the phase-inversion method include that described in JP-A No. 10-140065.

b) Acid Precipitation Method

The acid precipitation method is a method which includes preparing a water-containing cake containing a resin and a pigment, and neutralizing a part or all of anionic groups of the resin in the water-containing cake with a basic compound to produce an encapsulated pigment.

Specifically, the acid precipitation method includes (1) dispersing a resin and a pigment in an alkaline aqueous medium, and may further heat-treating the resultant if necessary, to produce a gel of the resin, (2) neutralizing or acidifying the system to hydrophobize the resin so as to firmly adhere the resin to a pigment, (3) performing filtration and water washing as necessary to yield a water-containing cake, (4) neutralizing, with a basic compound, a part or the all of anionic groups of the resin in the water-containing cake, and then re-dispersing the resin in an aqueous medium, and (5) performing heating as necessary to produce a gel of the resin.

More specific methods of the phase-inversion emulsification and the acid precipitation method are shown in JP-A Nos. 9-151342 and 10-14006.

In the invention, the content of the pigment is preferably from 0.1 mass % to 15 mass %, more preferably from 0.5 mass % to 12 mass %, and particularly preferably from 1 mass % to 10 mass %, with respect to the total amount of the ink composition, in consideration of coloring properties, graininess, ink stability and ink ejection reliability. The pigment may be used signly or in combination of two or more kinds of those selected from one or more groups of the pigments (1) to (4) and the like.

Pigment Dispersant

The pigment dispersant may facilitate dispersing of the pigment or stabilizing of the dispersed state of the pigment in a pigment dispersion. The pigment dispersant can be selected appropriately from those compounds having a function of dispersing a pigment in an aqueous phase. Examples of the pigment dispersant include nonionic compounds, anionic compounds, cationic compounds and amphoteric compounds.

Examples of the pigment dispersant include a homopolymer or a copolymer formed from monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bis-methacryloxyethyl phosphate, methacryloxyethylphenyl acid phosphate, ethyleneglycol dimethacrylate, diethyleneglycol dimethacrylate, styrene, styrene compounds such as $\alpha$-methyl styrene or vinyltoluene; vinyl cyclohexane, vinyl naphthalene, vinyl naphthalene compounds, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and modified compounds of the above compounds.

A homopolymer formed by polymerization of one kind of monomer having an $\alpha,\beta$-ethylenic unsaturated group, which may be selected from the above monomers, or a copolymer formed by copolymerization of plural kinds of monomer having an $\alpha,\beta$-ethylenic unsaturated group, each of which may be selected from the above monomers, may be used as a polymer dispersant. Examples of the polymer dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

From viewpoints of improving its absorbability to a pigment surface and dispersion stability imparting property, the pigment dispersant is preferably a water-insoluble resin, and more preferably a water-insoluble resin having a hydrophilic structural unit (a) and a hydrophobic structural unit (b). The water-insoluble resin may further have another structural unit which is different from the hydrophilic structural unit (a) and the hydrophobic structural unit (b) in accordance with necessity.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The "structural unit (of a polymer) derived from a (specific) monomer" herein means a unit that has a structure which can be typically incorporated into the polymer by employing the (specific) monomer as that to be polymerized for forming the polymer.

The dissociative group and/or a nonionic hydrophilic group may be incorporated into the water-insoluble resin by forming the water-insoluble resin using a monomer having a dissociative group and/or a monomer having a nonionic hydrophilic group.

The dissociative group may be preferable from the viewpoints of stabilizing of the emulsion state or the dispersed state of the pigment in a pigment dispersion. Examples of the dissociative group include a carboxyl group, a phosphonic acid group, and a sulfonic acid group. Among the above, the carboxyl group is preferable from the viewpoint of the dispersion stabilizing property when the ink composition is formed therewith.

The hydrophilic group-containing monomer is preferably a dissociative group-containing monomer, and specifically, the hydrophilic group-containing monomer is preferably a dissociative group-containing monomer having a dissociative group and an ethylenically unsaturated bond. Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, the unsaturated carboxylic acid monomer is preferable, and acrylic acid and methacrylic acid are more preferable, from the viewpoint of dispersion stability and jetting stability.

Examples of the hydrophilic structural unit (a) further include a structural unit derived from a monomer having a nonionic hydrophilic group. The monomer having a nonionic hydrophilic group is not particularly limited as long as it has both a nonionic hydrophilic functional group and a functional group (for example, an ethylenically unsaturated bond) that can form a polymer, and may be selected from monomers known in the art. Vinyl monomers are preferable from the viewpoint of availability, handleability and general versatility.

Examples of the hydrophilic structural unit (a) include hydrophilic functional group-containing vinyl monomers such as hydrophilic functional group-containing (meth)acrylates, hydrophilic functional group-containing (meth)acrylamides, or hydrophilic functional group-containing vinyl esters.

Examples of the "hydrophilic functional group" as used herein includes a hydroxyl group, an amino group, an amide group (in which nitrogen atom is unsubstituted), and alkylene oxides such as polyethylene oxide or polypropylene oxide described below.

Preferable examples of the hydrophilic structural unit (a) include hydroxyethyl(meth)acrylate, hydroxybutyl(meth)acrylate, (meth)acrylamide, aminoethyl acrylate, aminopropyl acrylate, and alkylene oxide polymer-containing (meth)acrylates.

The hydrophilic structural unit having a nonionic hydrophilic group may be incorporated into the water-insoluble resin by forming a polymer chain of the water-insoluble resin by polymerizing monomers corresponding to the hydrophilic structural unit. Alternatively, the hydrophilic structural unit having a nonionic hydrophilic group may be provided in the water-insoluble resin by introducing a hydrophilic functional group into a polymer chain of the water-insoluble resin which has been formed by polymerization.

The hydrophilic structural unit having a nonionic hydrophilic group is more preferably a hydrophilic structural unit having an alkylene oxide structure. From the viewpoint of hydrophilicity, the alkylene moiety of the alkylene oxide structure preferably has 1 to 6 carbon atoms, more preferably has 2 to 6 carbon atoms, and still more preferably has 2 to 4 carbon atoms. The degree of polymerization of the alkylene oxide structure is preferably 1 to 120, more preferably 1 to 60, and still more preferably 1 to 30.

In one preferable embodiment, the hydrophilic structural unit having a nonionic hydrophilic group is a hydroxyl group-containing hydrophilic functional unit. The number of a hydroxyl group(s) in the structural unit, although being not particularly limited, is preferably 1 to 4, more preferably 1 to 3, and still more preferably 1 to 2, from the viewpoint of the hydrophilicity of the water-insoluble resin and compatibility with a solvent and other monomers at the time of polymerization.

The content ratio of the hydrophilic structural unit may vary depending on the content ratio of the hydrophobic structural unit (b) and/or the like. For example, when the water-insoluble resin is composed exclusively of acrylic acid and/or methacrylic acid (hydrophilic structural unit (a)) and the hydrophobic structural unit (b), the content ratio of acrylic acid and/or methacrylic acid may be determined by "100−(the hydrophobic structural unit) (mass %)".

The hydrophilic structural units (a) may be used singly or as a mixture of two or more thereof.

The content ratio of the hydrophilic structural unit (a) is preferably in the range of 0% by mass to 15% by mass, more preferably in the range of 2% by mass to 15% by mass, still more preferably in the range of 5% by mass to 15% by mass, and further more preferably in the range of 8% by mass to 12% by mass, with respect to the total amount of the water-insoluble resin.

Hydrophobic Structural Unit (b)

Examples of the hydrophobic structural unit (b) include a hydrophobic structural unit (a) which has an aromatic ring which is linked to, through a linking group, an atom which configures a main chain structure of the water-insoluble resin.

The hydrophobic structural unit having the aromatic ring maintains an adequate distance between the aromatic ring, which is hydrophobic, and a hydrophilic structural unit in the water-insoluble resin because the aromatic ring is not directly linked to the an atom which configures a main chain structure of the water-insoluble resin. Therefore, an interaction between the water-insoluble resin and the pigment can easily occur, whereby the water-insoluble resin can be firmly adsorbed to the pigment, so that the dispersibility of the pigment can be improved.

Among the hydrophobic structural unit (a) which has an aromatic ring which is linked to, through a linking group, an atom which configures a main chain structure of the water-insoluble resin, examples of the hydrophobic structural unit (a) which is preferable from the viewpoint of facilitating easy granulation of the pigment include a structural unit represented by the following Formula (1).

Formula (1)

In Formula (1), $R^1$ represents a hydrogen atom, a methyl group or a halogen atom; $L^1$ represents *—COO—, *—OCO—, *—CONR$_2$—, *—O—, or a substituted or unsubstituted phenylene group wherein the side designated by "*" in each structure corresponds to the side linked to the main chain of the water-insoluble resin; and $R^2$ represents a hydrogen atom or an alkyl group having 1 to 10 carbon atoms. Here, examples of the substituent include, but are not limited to, a halogen atom, an alkyl group, an alkoxy group, a hydroxyl group, and a cyano group.

$L^2$ represents a single bond or a divalent linking group having 1 to 30 carbon atoms. If $L^2$ represents a divalent linking group, the linking group preferably has 1 to 25 carbon atoms, and more preferably has 1 to 20 carbon atoms. Particularly preferably, $L^2$ represents an alkyleneoxy group having 1 to 25 carbon atoms (more preferably 1 to 10 carbon atoms), an imoino group (—NH—), a sulfamoyl group, a divalent linking group containing an alkylene group such as an alkylene group having 1 to 20 carbon atoms (more preferably 1 to 15 carbon atoms) or ethyleneoxide group (—(CH$_2$CH$_2$O)$_n$—, in which n is an integer of from 1 to 6), and a group containing two or more of these in combination.

$Ar^1$ represents a monovalent group having an aromatic ring.

The aromatic ring of $Ar^1$ is not particularly limited, and examples thereof include a benzene ring, a condensed aromatic ring having 8 or more carbon atoms, a heterocyclic ring condensed with an aromatic ring, and connected benzene rings in which two or more benzene rings are connected.

In preferable embodiments, in Formula (1), $R^1$ represents a hydrogen atom or a methyl group, $L^1$ represents *—COO—, and $L^2$ represents a divalent linking group having 1 to 25 carbon atoms and containing an alkyleneoxy group and/or an alkylene group. In more preferable embodiments, in Formula (1), $R^1$ represents a hydrogen atom or a methyl group, $L^1$ represents *—COO—, and $L^2$ represents —(CH$_2$—CH$_2$—O)$_n$— (where n represents an average of numbers of repeating units and is from 1 to 6).

The condensed aromatic ring having 8 or more carbon atoms is an aromatic compound having 8 or more carbon atoms and containing: an aromatic ring formed by condensation of two or more benzene rings; and/or a ring formed by at least one aromatic ring and an alicyclic hydrocarbon condensed with the aromatic ring. Specific examples thereof include naphthalene, anthracene, fluorene, phenanthrene, and acenaphthene.

The heterocyclic ring condensed with an aromatic ring is a compound containing a condensed ring in which an aromatic compound (preferably a benzene ring) containing no hetero atom and a cyclic compound containing a hetero atom are condensed with each other. Here, the cyclic compound containing a hetero atom is preferably a 5-membered ring or a 6-membered ring. Preferable examples of the hetero atom include a nitrogen atom, an oxygen atom, and a sulfur atom. The cyclic compound containing a hetero atom may contain plural hetero atoms, and in this case, the hetero atoms may be the same or different from each other. Specific examples of the heterocyclic ring condensed with an aromatic ring include phthalimide, acridone, carbazole, benzoxazole, and benzothiazole.

Specific examples of a monomer that can form the structural unit represented by Formula (1) are shown below, although the invention is not restricted to the following examples.

M-1
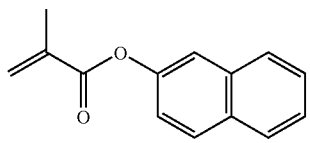

M-2
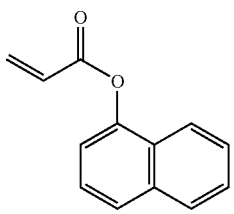

M-3
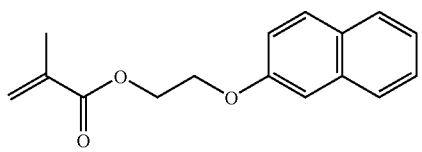

M-4
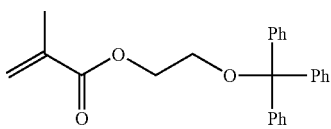

M-5
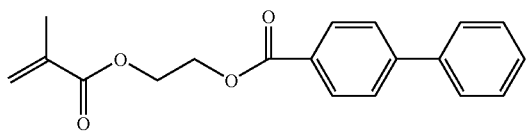

M-6
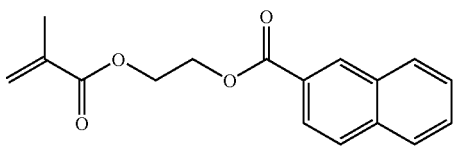

M-7
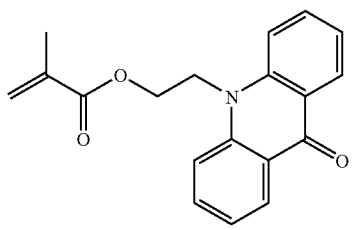

M-8
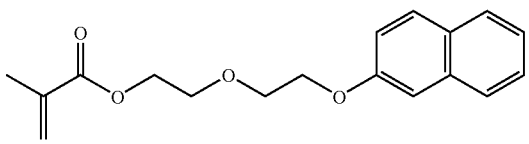

M-9
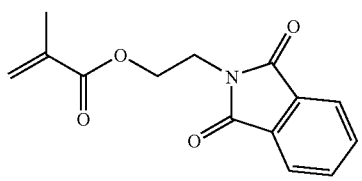

M-10
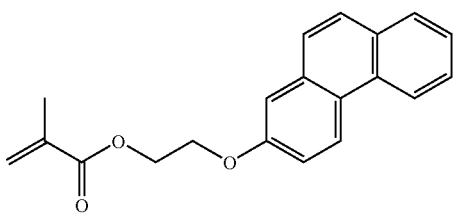

M-11
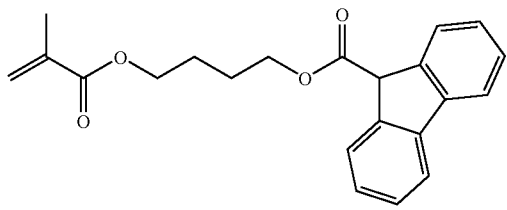

M-12
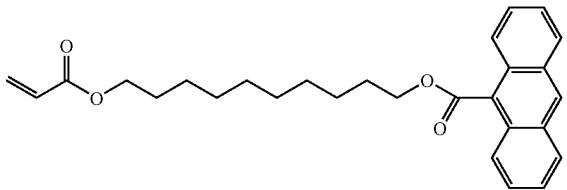

M-13 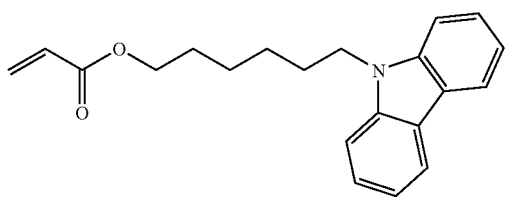

M-14 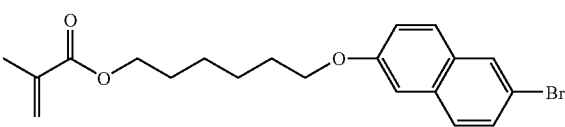

M-15 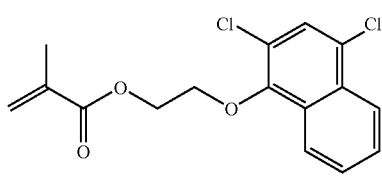

M-16 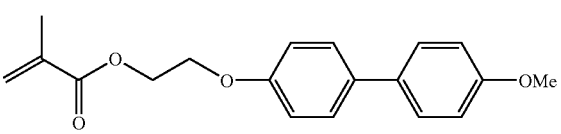

M-17 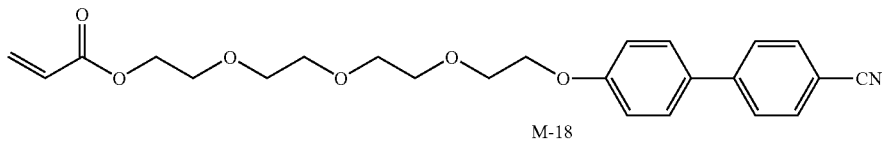

M-18 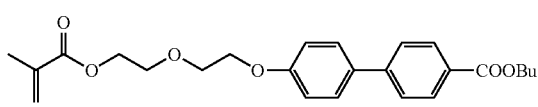

M-19 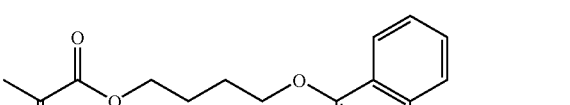

M-20 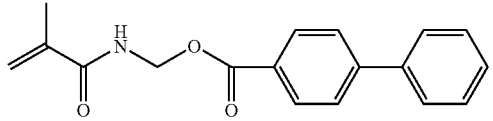

M-21 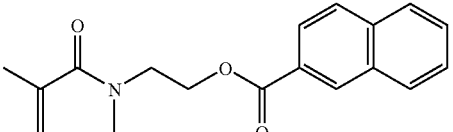

M-22 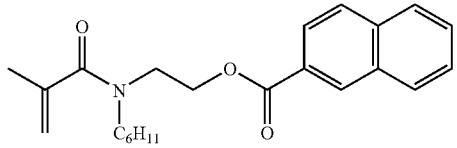

M-23 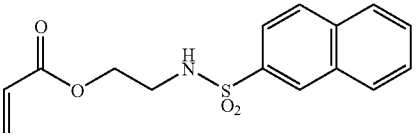

M-24 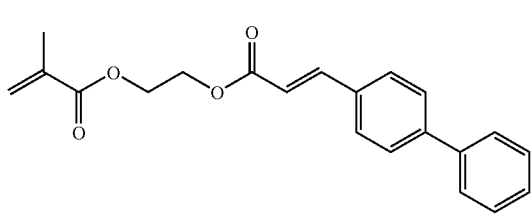

M-25 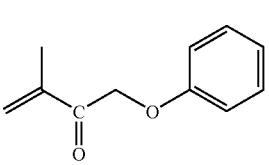

M-26 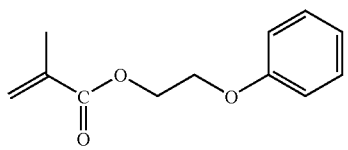

M-27 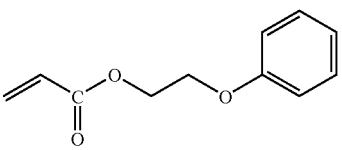

Among the structural units represented by Formula (1), structural unit formed by modifying benzyl methacrylate, phenoxyethyl acrylate or phenoxyethyl methacrylate may be preferable in consideration of the dispersion stability. In preferable embodiments, the water-insoluble resin contains one or more of the structural units selected from these as the hydrophobic structural unit (b).

The content of the hydrophobic structural unit having an aromatic ring which is linked to, through a linking group, an atom which configures the main chain of the water-insoluble resin is preferably 40 mass % or more, more preferably from 40 mass % to less than 75 mass %, still more preferably from 40 mass % to less than 70 mass %, and particularly preferably from 40 mass % to less than 60 mass %, with respect to the total amount of the water-insoluble resin, in consideration of dispersion stability of the pigment and ejection stability and cleanability of the ink composition.

The content of the aromatic ring which is linked to, through a linking group, an atom which configures the main chain of the water-insoluble resin is preferably from 15 mass % to 27 mass %, more preferably from 15 mass % to 25 mass %, and particularly preferably from 15 mass % to 20 mass %, with respect to the total amount of the water-insoluble resin, from the viewpoint of improving rubbing resistance. When the content of the aromatic ring is in the above ranges, rubbing resistance, ink stability and ink ejection reliability may be enhanced.

From the viewpoint of dispersion stability, the water-insoluble resin employed in the invention preferably has a structural unit derived from an alkyl(meth)acrylate having 1 to 4 carbon atoms in its alkyl group (a (meth)acrylic acid ester of an alkyl having 1 to 4 carbon atoms). The scope of "(meth) acrylic acid" include acrylic acid and methacrylic acid, and the scope of "(meth)acryate" include acrylate and methacrylate.

Specific examples of the alkyl(meth)acrylate include methyl(meth)acrylate, ethyl(meth)acrylate, (iso)propyl (meth)acrylate, and (iso- or tertiary-)butyl(meth)acrylate. The number of carbon atoms in the alkyl moiety of the alkyl ester is in the range of from 1 to 4, and is preferably 1 or 2.

From the viewpoint of dispersion stability, the content ratio of the "structural unit derived from an alkyl(meth)acrylate having 1 to 4 carbon atoms" in the water-insoluble resin is preferably 15% by mass or more with respect to the total amount of the water-insoluble resin. The content ratio of this structural unit is preferably 20% by mass to 60% by mass, more preferably 20% by mass to 50% by mass.

Examples of the hydrophobic structural unit (b) other than those described above include structural units which do not belong to the hydrophilic structural unit (a) (for example, structural units which do not have a hydrophilic functional group) and which are derived from vinyl monomers such as (meth)acrylamides, styrenes or vinyl esters, and (meth)acrylates such as alkyl esters (number of carbon atoms: 1 to 4) of methacrylates. These structural units may be used singly or as a mixture of two or more thereof.

Examples of the (meth)acrylamides include N-cyclohexyl (meth)acrylamide, N-(2-methoxyethyl)(meth)acrylamide, N,N-diallyl(meth)acrylamide and N-allyl(meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, and chloromethylstyrene; hydroxystyrene protected by a group (for example, t-Boc) that can be deprotected by an acidic material; methyl vinylbenzoate, α-methylstyrene, and vinyl naphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

These monomers may be used singly, or in combination of two or more kinds thereof as a mixture.

Examples of the (meth)acrylates include methyl(meth) acrylate, ethyl(meth)acrylate, (iso)propyl(meth)acrylate, and (iso- or tertiary-)butyl(meth)acrylate.

The content of the hydrophobic structural unit (b) in the composition of the water-insoluble resin, although varying depending on the degrees of the hydrophilicity and hydrophobicity of the hydrophilic structural unit (a) and the hydrophobic structural unit (B), is preferably higher than 80% by mass, more preferably higher than 85% by mass, with respect to the total amount of the water-insoluble resin. In other words, the content of the hydrophilic structural unit (a) is preferably in the range of 15% by mass or less, with respect to the total amount of the water-insoluble rein. When the content of the hydrophilic structural unit (a) is 15% by mass or less, the component which is dissolved by itself in an aqueous medium without contributing to dispersion of the pigment is reduced. Therefore, the dispersed state of the pigment can be kept excellent, and the viscosity can be suppressed from increasing, and thus the water-insoluble resin when used in an ink for inkjet recording can improve jetting performance.

The water-insoluble resin employed in the invention may be a random copolymer in which the respective structural units are randomly introduced or a block copolymer in which the respective structural units are regularly introduced. When the water-insoluble resin is a block copolymer, the order of introducing the respective structural units during the synthesis of the block polymer is not limited; further, the same structural unit may be used two or more times during the synthesis of the block copolymer. The water-insoluble resin is preferably a random copolymer in consideration of the versatility and manufacturability.

The acid value of the pigment dispersant (specifically the water-insoluble resin) of the invention is preferably from 30 mg KOH/g to 100 mg KOH/g, more preferably 30 mg KOH/g or more and less than 85 mg KOH/g, and particularly preferably 50 mg KOH/g or more and less than 85 mg KOH/g, in consideration of the pigment dispersibility and storage stability.

Here, the acid value is defined as the weight (mg) of KOH required for completely neutralizing 1 g of the water-insoluble resin, and can be measured in accordance with the method described in JIS Standard (JIS-K0070 (1992); the disclosure of which is incorporated by reference herein), which corresponds to ASTM D974.

The molecular weight of the water-insoluble resin used in the invention is, in terms of a weight average molecular weight (Mw), preferably from 30,000 to 150,000, more preferably from 30,000 to 100,000, and still more preferably from 30,000 to 80,000.

When the water-insoluble resin has a molecular weight which is 30,000 or more, steric repulsion effect that the water-insoluble resin can exerts as a dispersant may improve and the time it takes for the water-insoluble resin to adsorb to the pigment may be shortened due to steric effect.

The number-average molecular weight (Mn) of the water-insoluble resin employed in the invention is preferably in the range of about 1,000 to about 100,000, more preferably in the range of about 3,000 to about 50,000. When the number-average molecular weight is in the range defined above, the water-insoluble resin may function as a coating film on the pigment or function as a coating film of the ink. The water-insoluble resin employed in the invention is used preferably in the form of an alkali metal salt or an organic amine salt.

The molecular weight distribution (weight average molecular weight/number average molecular weight) of the water-insoluble resin used in the invention is preferably from 1 to 6, and more preferably from 1 to 4. It is preferable that the molecular weight distribution is set within the above ranges in consideration of the dispersion stability and ejection stability of the ink composition.

Each of the number average molecular weight and the weight average molecular weight used herein is a molecular weight value obtained by measuring a molecular weight with a GPC analyzer using columns of TSKgel GMHxL, TSKgel G4000HxL and TSKgel G2000HxL (trade names, manufactured by Tosoh Corporation) and then converting the measured value using polystyrene as a reference material; the solvent used for GPC is THF and the detection is conducted by a differential refractometer.

The water-insoluble resin used in the invention can be synthesized using various polymerization methods, such as a solution polymerization, a precipitation polymerization, a suspension polymerization, a bulk polymerization, or an emulsion polymerization. The polymerization reaction can be performed by known operations such as a batch system, a semi-continuous system or a continuous system.

Examples of the method of polymerization initiation include a method using a radical initiator and a method including photo-irradiation or radiation. These polymerization methods and the polymerization initiation methods are described, for example, in Teiji Tsuruta, "Kobunshi Gousei Houhou" (Polymer Synthesis Method), revised edition (Nikkan Kogyo Shimbun (1971)) and Takayuki Otsu and Masayoshi Kinoshita, "Koubunshi Gousei-no Jikken-ho" (Experimental Method of Polymer Synthesis), (Kagaku-Dojin (1972)), pp. 124-154.

Specifically, the water-insoluble resin may be produced by subjecting a mixture which contains monomers and may further contain an organic solvent and a radical polymerization initiator in accordance with necessity to copolymerization under inert gas atmosphere. Among the polymerization methods, the solution polymerization method using a radical initiator is particularly preferable. Examples of the solvent used in the solution polymerization method include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used singly, or may be used in the form of a mixture of two or more kinds thereof, or may be mixed with water and used as a mixed solvent.

The polymerization temperature should be set in consideration of, for example, the molecular weight of the polymer to be formed and the kind of the initiator. In general, the polymerization temperature is from about 0° C. to about 100° C. It is preferable to perform polymerization at a temperature of from 50° C. to 100° C.

The reaction pressure can be suitably selected, and is usually from about 1 kg/cm² to about 100 kg/cm², and is preferably from about 1 kg/cm² to about 30 kg/cm². The reaction time may be from about 5 hours to about 30 hours. The obtained resin may be purified by reprecipitation or the like.

Preferable examples of the water-insoluble resin of the invention are shown below, while the invention is not limited thereto. Herein, a, b, c, d, e, f, g, h, and i each represent a ratio of the respective unit in terms of mass % with respect to the total amount of the exemplified water-insoluble resin.

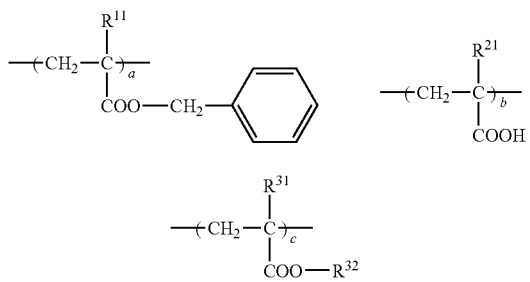

| | $R^{11}$ | $R^{21}$ | $R^{31}$ | $R^{32}$ | a | b | c | Mw |
|---|---|---|---|---|---|---|---|---|
| B-1 | $CH_3$ | $CH_3$ | $CH_3$ | —$CH_3$ | 60 | 10 | 30 | 46000 |
| B-2 | H | H | H | —$CH_3$ | 60 | 10 | 30 | 50000 |
| B-3 | $CH_3$ | $CH_3$ | $CH_3$ | —$CH_2CH_3$ | 61 | 10 | 29 | 43000 |
| B-4 | $CH_3$ | $CH_3$ | $CH_3$ | —$CH_2CH_2CH_2CH_3$ | 61 | 9 | 30 | 51000 |
| B-5 | $CH_3$ | $CH_3$ | $CH_3$ | —$CH(CH_3)_2$ | 60 | 9 | 31 | 96000 |
| B-6 | H | H | H | —$C(CH_3)_3$ | 60 | 10 | 30 | 32000 |
| B-7 | $CH_3$ | $CH_3$ | $CH_3$ | —$CH_2CH(CH_3)_2$ | 70 | 5 | 25 | 75000 |

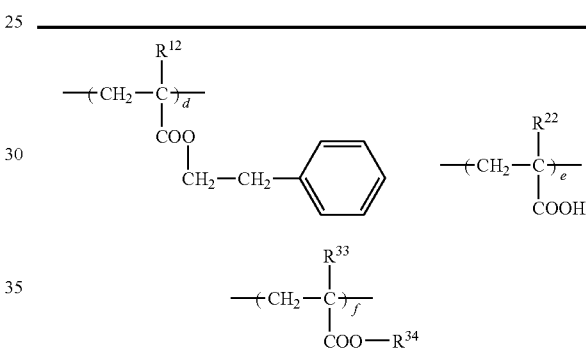

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | —$CH_3$ | 55 | 12 | 33 | 31000 |
| B-9 | H | H | H | —$CH_2CH(CH_3)_2$ | 70 | 10 | 20 | 34600 |

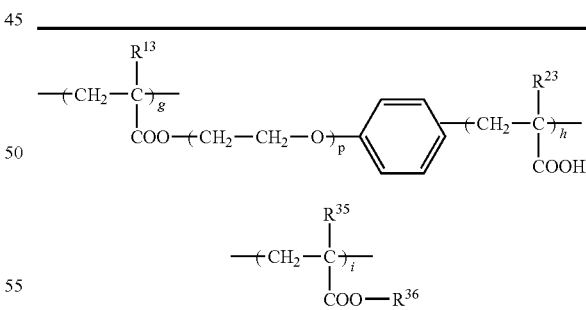

| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | —$CH_3$ | 60 | 9 | 31 | 35500 |
| B-11 | H | 1 | H | H | —$CH_2CH_3$ | 69 | 10 | 21 | 41200 |
| B-12 | $CH_3$ | 2 | $CH_3$ | $CH_3$ | —$CH_3$ | 70 | 11 | 19 | 68000 |
| B-13 | $CH_3$ | 4 | $CH_3$ | $CH_3$ | —$CH(CH_3)_2$ | 70 | 7 | 23 | 72000 |
| B-14 | H | 5 | H | H | —$CH_3$ | 70 | 10 | 20 | 86000 |

-continued
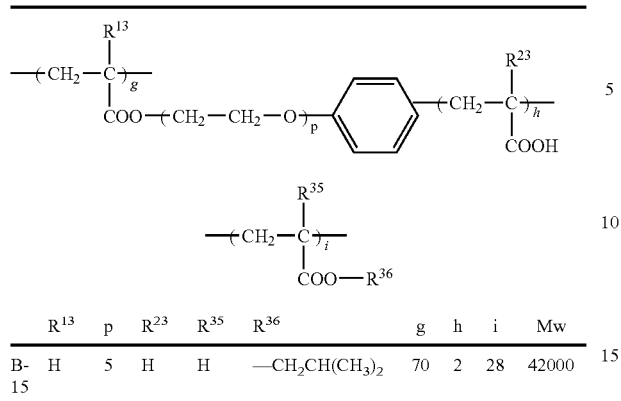
| | $R^{13}$ | p | $R^{23}$ | $R^{35}$ | $R^{36}$ | g | h | i | Mw |
|---|---|---|---|---|---|---|---|---|---|
| B-15 | H | 5 | H | H | —CH$_2$CH(CH$_3$)$_2$ | 70 | 2 | 28 | 42000 |
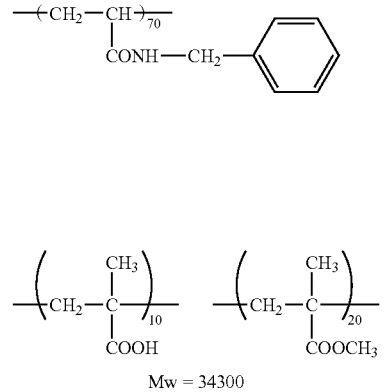
B-16
Mw = 34300
| | | Mw |
|---|---|---|
| B-17 | 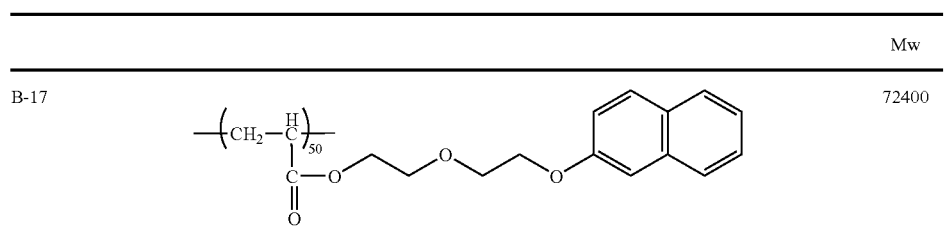 | 72400 |
| B-18 | 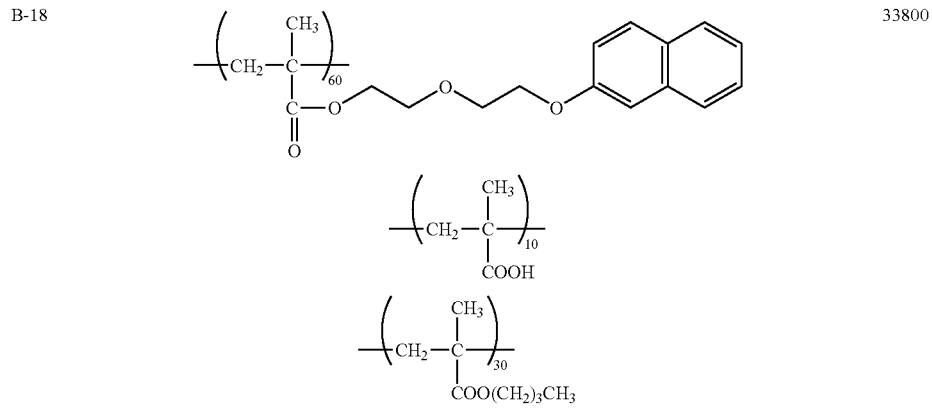 | 33800 |
| B-19 | 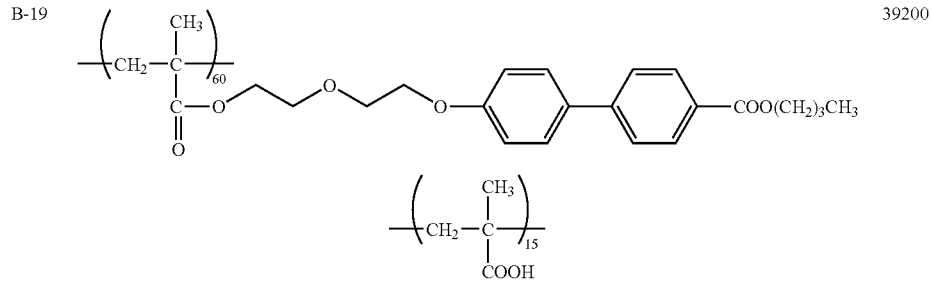 | 39200 |

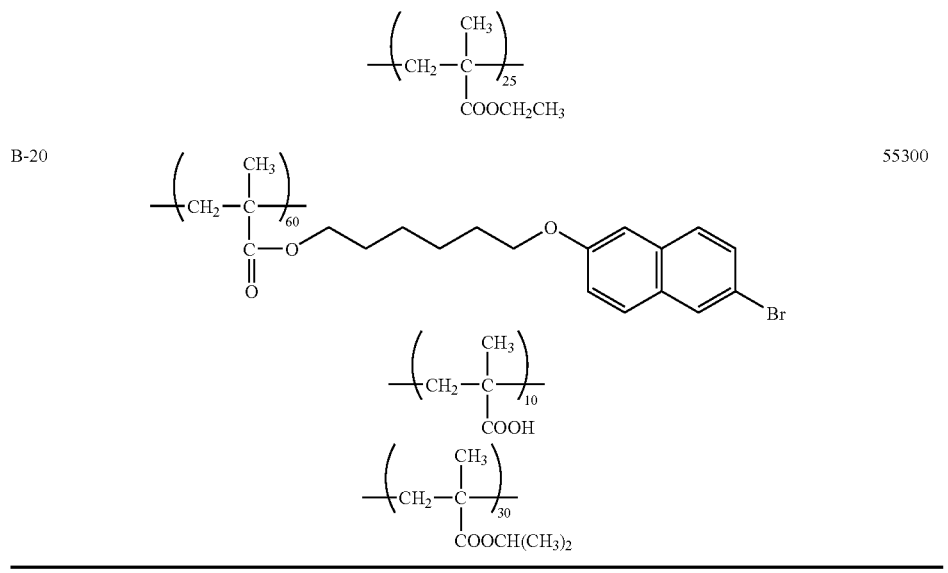

Content Ratio of Pigment Dispersant to Pigment

The ratio (mass ratio) of a content a pigment dispersant to a content a pigment (pigment dispersant/pigment) in the ink composition is preferably from 25/100 to 140/100, and more preferably from 25/100 to 50/100. When the ratio is 25/100 or more, the dispersion stability and rubbing resistance may tend to be improved. When the content ratio is 140/100 or less, the dispersion stability may tend to be improved as well.

(c) Polymer Particle

The ink composition employed in the invention contains at least one kind of polymer particles. This configuration can effectively improve rubbing resistance of an image formed by the ink composition.

Examples of the polymer particles employed in the invention include particles of a resin having an anionic group such as: a thermoplastic, thermosetting, or modified acrylic resin, an epoxy resin, a polyurethane resin, a polyether resin, a polyamide resin, an unsaturated polyester resin, a phenol resin, a silicone resin, or a fluoro resin; a polyvinyl resin such as vinyl chloride, vinyl acetate, polyvinyl alcohol, or polyvinyl butyral, a polyester resin such as an alkyd resin or a phthalic resin; an amino resin material such as a melamine resin, a melamine formaldehyde resin, an amino alkyd co-condensation resin, a urea resin, or a urea resin; or mixtures or copolymers thereof.

Among the above, the anionic acrylic resin can be obtained by polymerizing, in a solvent, acrylic monomers having an anionic group (anionic group-containing acrylic monomer) and, as required, another monomer that can be copolymerized with the anionic group-containing acrylic monomer. Examples of the anionic group-containing acrylic monomer include an acrylic monomer having at least one selected from the group consisting of a carboxyl group, a sulfonic acid group, and a phosphonic acid group. Among the above, the acrylic monomers having a carboxyl group (e.g., acrylic acid, methacrylic acid, crotonic acid, ethacrylic acid, propylacrylic acid, isopropylacrylic acid, itaconic acid, and fumaric acid) are preferable, and acrylic acid or methacrylic acid is particularly preferable.

In preferable embodiments, the polymer particles employed in the invention may be self-dispersible polymer particles, and in more preferable embodiments, the polymer particles employed in the invention can be self-dispersible polymer particles having a carboxyl group, from the viewpoint of jetting stability and stability of ink composition as liquid (particularly dispersion stability) when the pigment described above is used.

The "self-dispersible polymer particles" refer to particles of a water-insoluble polymer that can be in a dispersion state in an aqueous medium in the absence of another surfactant by a functional group (particularly an acidic group or a salt thereof) contained in the polymer and that does not contain a free emulsifier.

The "dispersion state" can be either an emulsion state, in which the water-insoluble polymer is dispersed as a liquid in an aqueous medium, or a suspension state, in which the water-insoluble polymer is dispersed as a solid in an aqueous medium.

From the viewpoint of the aggregation rate and the fixing property when the water-insoluble polymer is employed to form the ink composition, the water-insoluble polymer used in the invention is preferably one that can be in the suspension state.

The self-dispersible polymer particles employed in the invention can be visually observed as being in the dispersion state at 25° C. for at least one week, even when the dispersion thereof is prepared by mixing and stirring, by using a stirrer having a stirring blade with number of rotations of 200 rpm for 30 minutes at 25° C., a mixture of a solution containing 30 g of the water-insoluble polymer dissolved in 70 g of organic solvent such as methyl ethyl ketone, a neutralizer which can neutralize all salt-forming groups of the water-insoluble polymer, and 200 g of water, and then removing the organic solvent from the mixture solution, although the neutralizer is either sodium hydroxide when the salt-forming group is anionic or is acetic acid when a salt-forming group is cationic.

The "water-insoluble polymer" refers to a polymer whose dissolved amount to 100 g of water at 25° C. is 10 g or lower when the polymer is dried at 105° C. for 2 hours and then dissolved in the water. The dissolved amount is preferably 5 g or lower, and more preferably 1 g or lower. The "dissolved amount" is an amount of (a part of) the water-insoluble polymer dissolved in a solvent (water) when the water-insoluble polymer is completely neutralized with sodium hydroxide or acetic acid, wherein the selection from the sodium hydroxide and the acetic acid accords to the type of the salt-forming group of the water-insoluble polymer.

The aqueous medium contains water and may further contain a hydrophilic organic solvent as required. In preferable embodiments, the aqueous medium contains water and a hydrophilic organic solvent, an amount of the hydrophilic organic solvent being in a range of 0.2 mass % or less with respect to water, and in more preferable embodiments, the aqueous medium is substantially water.

There is no limitation on the main chain skeleton of the water-insoluble polymer. Examples include vinyl polymer and a condensed polymer (e.g., an epoxy resin, polyester, polyurethane, polyamide, cellulose, polyether, polyurea, polyimide, and polycarbonate). Among the above, vinyl polymer is particularly preferable.

Preferable examples of vinyl polymer and a monomer which configures vinyl polymer include substances disclosed in JP-A Nos. 2001-181549 and 2002-88294. Moreover, a vinyl monomer in which a dissociative group has been introduced into a terminal of a polymer by radical polymerization of a vinyl polymer using a chain transfer agent or a polymerization initiator having a dissociative group (or a substituent that can be induced to be a dissociative group) or an iniferter or by ion polymerization using a compound having a dissociative group (or a substituent that can be induced to be a dissociative group) in either an initiator or a stopper also can be used.

Preferable examples of a condensed polymer and a monomer which configures the condensed polymer include substances described in JP-A No. 2001-247787.

In preferable embodiments, the self-dispersible polymer particles employed in the invention contains a water-insoluble polymer containing a hydrophilic structural unit and a structural unit derived from an aromatic group-containing monomer from the viewpoint of self-dispersibility.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The hydrophilic group is preferably a dissociative group, and more preferably an anionic dissociative group, from the viewpoint of promoting the self-dispersibility and improving stability of the emulsion state or dispersion state of the self-dispersible polymer particles. Examples of the dissociative group include a carboxyl group, a phosphonic acid group, and a sulfonic acid group. Among the above, the carboxyl group is preferable from the viewpoint of fixing property when the ink composition is formed therewith.

The hydrophilic group-containing monomer is preferably a dissociative group-containing monomer from the viewpoint of self-dispersibility and aggregation properties, and specifically, the hydrophilic group-containing monomer is preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoint of dispersion stability and jetting stability, the unsaturated carboxylic acid monomer is preferable, and acrylic acid and methacrylic acid are more preferable.

In preferable embodiments, the self-dispersible polymer particles employed in the invention contain a polymer having a carboxyl group from the viewpoint of improving self-dispersibility and an aggregation rate when the ink composition contacts a treatment liquid. In more preferable embodiments, the self-dispersible polymer particles employed in the invention contain a polymer having a carboxyl group and an acid value (mgKOH/g) of 25 to 100. In further preferable embodiments, the acid value is from 25 to 80, and in particularly preferablle embodiments, the acid value is from 30 to 65, from the viewpoint of improving self-dispersibility and an aggregation rate when the ink composition contacts a treatment liquid.

Stability of the dispersion state of the self-dispersible polymer particles can be favorable when the acid value is 25 or more, and the aggregation properties can be improved when the acid value is 100 or lower.

There is no limitation on the aromatic group-containing monomer insofar as it is a compound containing an aromatic group and a polymerizable group. The aromatic group may be a group derived from an aromatic hydrocarbon or a group derived from an aromatic heterocyclic ring. In embodiments, the aromatic group is preferably an aromatic group derived from an aromatic hydrocarbon from the viewpoint of particle shape stability in an aqueous medium.

The polymerizable group may be a condensation polymerizable group or an addition polymerizable group. In embodiments, from the viewpoint of particle shape stability of the self-dispersible polymer particles in the aqueous medium, the polymerizable group preferably an addition polymerizable group, and more preferably a group containing an ethylenically unsaturated bond.

The aromatic group-containing monomer employed in the invention is preferably a monomer having an ethylenically unsaturated bond and an aromatic group derived from aromatic hydrocarbon. The aromatic group-containing monomers may be used singly or in combination of two or more.

Examples of the aromatic group-containing monomer include phenoxyethyl(meth)acrylate, benzyl(meth)acrylate, phenyl(meth)acrylate, and a styrene monomer. Examples which are preferable from the viewpoint of well-balancing hydrophilicity and hydrophobicity of the polymer chain of the self-dispersible polymer particles and ink fixing property include an aromatic group-containing (meth)acrylate monomer. Specifically, phenoxyethyl(meth)acrylate, benzyl(meth)acrylate, and phenyl(meth)acrylate are more preferable, and phenoxyethyl(meth)acrylate and benzyl(meth)acrylate are further preferable.

The "(meth)acrylate" refers to acrylate or methacrylate.

In preferable embodiments, the self-dispersible polymer particles employed in the invention contains a structural unit derived from the aromatic group-containing (meth)acrylate monomer, the content of which being from 10 mass % to 95 mass % with respect to the total amount of the water-insoluble polymer which forms the self-dispersible polymer particles. When the content of the aromatic group-containing (meth) acrylate monomer is from 10 mass % to 95 mass %, self-emulsifying property or stability of the dispersion state improves to thereby suppress an increase in ink viscosity.

In embodiments, the content of the aromatic group-containing (meth)acrylate monomer is more preferably from 15 mass % to 90 mass %, more preferably from 15 mass % to 80 mass %, and particularly preferably from 25 mass % to 70 mass %, from the viewpoint of improvement in self-emulsifying property or stability of the dispersion state, stabilization of the particle shape in an aqueous medium due to hydrophobic interaction of aromatic rings, and reduction in the amount of water-soluble components via appropriate hydrophobilyzation of particles.

The self-dispersible polymer particles employed in the invention can be formed by using, for example, a structural unit derived from the aromatic group-containing monomer and a structural unit derived from the dissociative group-containing monomer. The self-dispersible polymer particles may further comtain other structural units.

While there is no limitation on a monomer which forms thetheher structural unit insofar as it can be copolymerized with the aromatic group-containing monomer and the dissociative group-containing monomer, from the viewpoint of flexibility of the main chain skeleton of the water-insoluble polymer or ease of regulation of glass transition temperature (Tg), an alkyl group-containing monomer is preferable.

Examples of the alkyl group-containing monomer include alkyl(meth)acrylates, such as methyl(meth)acrylate, ethyl (meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, or ethylhexyl (meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylamino alkyl (meth)acrylates, such as dimethylaminoethyl(meth)acrylate; N-hydroxyalkyl(meth)acrylamides, such as N-hydroxymethyl(meth)acrylamide, N-hydroxyethyl(meth)acrylamide, or N-hydroxybutyl(meth)acrylamide; and (meth)acrylamides, such as N-alkoxyalkyl(meth)acrylamides, such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide, or N-(n-, iso)butoxyethyl(meth) acrylamide.

The molecular weight range of the water-insoluble polymer which configures the self-dispersible polymer particles employed in the invention is, in terms of weight average molecular weight, preferably from 3,000 to 200,000, more preferably from 5,000 to 150,000, and still more preferably from 10,000 to 100,000. By adjusting the weight average molecular weight to 3,000 or more, the content of water-soluble components can be effectively reduced. By adjusting the weight average molecular weight to 200,000 or lower, stability of self-dispersibility can be increased.

The weight average molecular weight can be measured by gel permeation chromatography (GPC). HLC-8020GPC (trade name, manufactured by Tosoh Corporation) is used as GPC apparatus, three columns of TSKGEL, SUPER MULTIPORE HZ-H (trade name, manufactured by Tosoh Corporation, 4.6 mmID×15 cm), and THF (tetrahydrofuran) as an eluate. The measurement is performed using an IR detector under the conditions of a sample concentration of 0.35/min., a flow rate of 0.35 ml/min., an injection amount of a sample of 10 µl, and a measurement temperature of 40° C. Calibration curves are prepared by eight samples of REFERENCE SAMPLE TSK STANDARD, POLYSTYRENE (trade name, manufactured by Tosoh Corporation): "F-40", "F-20", "F-4", "F-1", "A-5000", "A-2500", "A-1000" and "n-propylbenzene".

From the viewpoint of regulation of hydrophilicity and hydrophobicity of a polymer, in preferable embodiments, the water-insoluble polymer which configures the self-dispersible polymer particles employed in the invention contains a structural unit derived from the aromatic group-containing (meth)acrylate monomer (preferably a structural unit derived from phenoxyethyl(meth)acrylate and/or a structural unit derived from benzyl(meth)acrylate), wherein the content (copolymerization ratio) of the aromatic group-containing (meth)acrylate monomer is from 15 mass % to 80 mass % with respect to the total amount of self-dispersible polymer particles.

From the viewpoint of regulation of hydrophilicity and hydrophobicity of a polymer, in preferable embodiments, the water-insoluble polymer preferably contains a structural unit derived from the aromatic group-containing (meth)acrylate monomer, a structural unit derived from a carboxyl group-containing monomer, and a structural unit derived from an alkyl group-containing monomer (preferably a structural unit derived from alkyl ester of (meth)acrylic acid wherein the content (copolymerization ratio) of the aromatic group-containing (meth)acrylate monomer is from 15 mass % to 80 mass % with respect to the total amount of self-dispersible polymer particles. In more preferable embodiments, the water-insoluble polymer contains a structural unit derived from phenoxyethyl(meth)acrylate and/or a structural unit derived from benzyl(meth)acrylate, a structural unit derived from a carboxyl group-containing monomer, and a structural unit derived from an alkyl group-containing monomer (preferably a structural unit derived from alkyl ester having 1 to 4 carbon atoms of (meth)acrylic acid), wherein the content (copolymerization ratio) of the phenoxyethyl(meth)acrylate and/or a structural unit derived from benzyl(meth)acrylate is from 15 mass % to 80 mass % with respect to the total amount of self-dispersible polymer particles. In addition, the water-insoluble polymer preferably has the acid value of from 25 to 100 and the weight average molecular weight of 3,000 to 200,000, and more preferably has the acid value of from 25 to 95 and the weight average molecular weight of 5,000 to 150,000.

Hereinafter, exemplary compounds B-01 to B-19 are shown as specific examples of the water-insoluble polymer which configures the self-dispersible polymer particles, although the invention is not limited thereto. The ratio in the brackets represents the mass ratio of copolymerization components.

B-01: Phenoxyethyl acrylate/Methyl methacrylate/Acrylate copolymer (50/45/5)

B-02: Phenoxyethyl acrylate/Benzyl methacrylate/Isobutyl methacrylate/Methacrylate copolymer (30/35/29/6)

B-03: Phenoxyethyl methacrylate/Isobutyl methacrylate/Methacrylate copolymer (50/44/6)

B-04: Phenoxyethyl acrylate/Methyl methacrylate/Ethylacrylate/Acrylate Copolymer (30/55/10/5)

B-05: Benzyl methacrylate/Isobutyl methacrylate/Methacrylate copolymer (35/59/6)

B-06: Styrene/Phenoxyethyl acrylate/Methyl methacrylate/Acrylate copolymer (10/50/35/5)

B-07: Benzyl acrylate/Methyl methacrylate/Acrylate copolymer (55/40/5)
B-08: Phenoxyethyl methacrylate/Benzyl acrylate/Methacrylate copolymer (45/47/8)
B-09: Styrene/Phenoxyethyl acrylate/Butyl methacrylate/Acrylate copolymer (5/48/40/7)
B-10: Benzyl methacrylate/Isobutyl methacrylate/Cyclohexyl methacrylate/Methacrylate copolymer (35/30/30/5)
B-11: Phenoxyethyl acrylate/Methyl methacrylate/Butyl acrylate/Methacrylate copolymer (12/50/30/8)
B-12: Benzyl acrylate/Isobutyl methacrylate/Acrylate copolymer (93/2/5)
B-13: Styrene/Phenoxyethyl methacrylate/Butyl acrylate/Acrylate copolymer (50/5/20/25)
B-14: Styrene/Butyl acrylate/Acrylate copolymer (62/35/3)
B-15: Methyl methacrylate/Phenoxyethyl acrylate/Acrylate copolymer (45/51/4)
B-16: Methyl methacrylate/Phenoxyethyl acrylate/Acrylate copolymer (45/49/6)
B-17: Methylmethacrylate/Phenoxyethyl acrylate/Acrylate copolymer (45/48/7)
B-18: Methyl methacrylate/Phenoxyethyl acrylate/Acrylate copolymer (45/47/8)
B-19: Methylmethacrylate/Phenoxyethyl acrylate/Acrylate Copolymer (45/45/10)

There is no limitation on a method of producing the water-insoluble polymer which configures the self-dispersible polymer particles employed in the invention. Examples include: a method including performing emulsion polymerization in the presence of a polymerizable surfactant to covalently bind a surfactant and a water-insoluble polymer; and a method including copolymerizing a monomer mixture containing the hydrophilic group-containing monomer and the aromatic group-containing monomer by known polymerization methods such as a solution-polymerization method or a block-polymerization method. Among the polymerization methods, the solution-polymerization method is preferable, and the solution-polymerization method using an organic solvent is more preferable, from the viewpoint of an aggregation rate and droplet jetting stability when the self-dispersible polymer particles are employed in the ink composition.

From the viewpoint of an aggregation rate, it is preferable that the self-dispersible polymer particles employed in the invention contain a polymer, the polymer being synthesized in an organic solvent and having a carboxyl group (preferably the acid value thereof being 20 to 100), and the self-dispersible polymer particles being prepared as a polymer dispersion in which the carboxyl group of the polymer is partially or thoroughly neutralized and water serves as a continuous phase. More specifically, the production of the self-dispersible polymer particles employed in the invention preferably has synthesizing a polymer in an organic solvent and dispersing the polymer to form an aqueous dispersion in which at least a part of the carboxyl group of the polymer is neutralized.

The dispersing preferably includes the following processes (1) and (2).

Process (1): Stirring a mixture containing a polymer (water-insoluble polymer), an organic solvent, a neutralizer, and an aqueous medium; and Process (2): Removing the organic solvent from the mixture.

The process (1) preferably includes obtaining a dispersion by dissolving the polymer (water-insoluble polymer) in an organic solvent first, gradually adding a neutralizer and an aqueous medium, and mixing and stirring the mixture. The addition of the neutralizer and the aqueous medium in a solution of the water-insoluble polymer in which the polymer has been dissolved into an organic solvent may enable to provide self-dispersible polymer particles having particle diameters which may enable to achieve higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the solvents, the ketone solvent, such as methyl ethyl ketone, and the alcohol solvent, such as isopropyl alcohol, are preferable. It is also preferable to use isopropyl alcohol and methyl ethyl ketone in combination in view of making the change in polarity at the time of phase inversion from an oil phase to a water phase being moderate. By using the solvents in combination, self-dispersible polymer particles that can be free from coagulation-precipitation or fusion of particles and can have high dispersion stability and fine particle diameters can be obtained.

The neutralizer is used for forming an emulsion state or a dispersion state in which the dissociative group is partially or thoroughly neutralized and the self-dispersible polymer is stabilized in water. Examples of the neutralizer which can be used when the self-dispersible polymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the self-dispersible polymer particles employed in the invention in water, sodium hydroxide, potassium hydroxide, triethylamine, and triethanolamine are preferable.

The content of the basic compound is preferably from 5 mol % to 120 mol %, more preferably from 10 mol % to 110 mol %, and still more preferably from 15 mol % to 100 mol %, with respect to 100 mol % of the dissociative groups. Stabilization of the dispersion of the particles in water can be demonstrated when the content of the basic compound is adjusted to 5 mol % or more, more specifically 10 mol % or more, and particularly specifically 15 mol % or more. Reduction in a content of water-soluble components can be obtained when the content of the basic compound is adjusted to 120 mol % or less, more specifically 110 mol % or less, and particularly specifically 100 mol % or less.

In the process (2), an aqueous dispersion of the self-dispersible polymer particles can be obtained by inverting a phase of the dispersion, which has been obtained in the process (1), to a water phase by common procedures such as vacuum distillation distilling off the organic solvent from.

The thus-obtained aqueous dispersion is substantially free of the organic solvent. The amount of the organic solvent contained in the aqueous dispersion is preferably 0.2 mass % or less, and more preferably 0.1 mass % or less.

The average particle diameter of the polymer particles (particularly the self-dispersible polymer particles) is, in terms of a volume average particle diameter, preferably in the range of 10 nm to 400 nm, more preferably in the range of 10 nm to 200 nm, still more preferably in the range of 10 nm to 100 nm, and particularly preferably in the range of 10 nm to 50 nm. When the average particle diameter is 10 nm or more, suitability of the polymer particles to production process may be increased. When the average particle diameter is 400 nm or lower, the storage stability may be increased. The particle size distribution of the polymer particles is not particularly limited. The polymer particles may have either a broad particle size distribution or a monodisperse particle size distribution. Two or more water-insoluble particles may be used in combination as a mixture.

The average particle diameter and particle size distribution of the polymer particles can be determined by measuring the volume average particle diameter by dynamic light scattering using a nanotruck particle size distribution meter UPA-EX150 (trade name, manufactured by Nikkiso Co., Ltd.).

From the viewpoint of glossiness of an image formed from the ink composition or the like, the content of the polymer particles (particularly the self-dispersible polymer particles) in the ink composition is preferably from 1 mass % to 30 mass %, and more preferably 2 mass % to 15 mass %, with respect to the total amount of the ink composition.

The polymer particles (particularly the self-dispersible polymer particles) can be used singly or in a form of a mixture of two or more thereof.

Water

The ink composition employed in the invention contains water.

While the amount of water contained in the ink composition is not particularly limited, the addition amount of water is preferably from 10 mass % to 99 mass %, more preferably from 30 mass % to 80 mass %, and still more preferably from 50 mass % to 70 mass %, with respect to the total amount of the ink composition from the viewpoint of maintaining the stability and ejection reliability of the ink composition.

(e) Surfactant

The ink composition employed in the invention may contain a surfactant as a surface tension adjusting agent.

Examples of the surface tension adjusting agent include a nonionic surfactant, a cationic surfactant, an anionic surfactant, and a betaine surfactant. An amount of the surface tension adjusting agent is preferably adjusted so as to set the surface tension of the ink composition to be from 20 mN/m to 60 mN/m, more preferably from 20 mN/m to 45 mN/m, and still more preferably from 25 mN/m to 40 mN/m, in consideration of ink ejecting stability when the ink composition is used in an inkjet recording method.

A compound having a structure in which a hydrophilic moiety and a hydrophobic moiety are included in a molecule thereof can be effectively used as the surfactant. Any of an anionic surfactant, a cationic surfactant, an amphoteric surfactant, and a nonionic surfactant can be used. The polymer substance (polymer dispersant) can be also used as the surfactant.

Examples of the anionic surfactant include sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctylsulfosuccinate, a sodium polyoxyethylene alkylether sulfate, a sodium polyoxyethylene alkylphenylether sulfate, sodium dialkylsulfosuccinate, sodium stearate, sodium oleate, and sodium t-octylphenoxyethoxy-polyethoxyethyl sulfate. The anionic surfactant may be used singly, or in combination of two or more thereof.

Examples of the nonionic surfactant include acetylenediol compounds such as an acetylenediol ethyleneoxide adducts, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

In view of preventing interference among applied ink droplets, nonionic surfactants are preferable, and in particular, acetylenediol compounds are preferable.

The content of the surfactant in the ink composition employed in the invention is not specifically limited, although it is preferably from 0.1 mass % or more, more preferably from 0.5 mass % to 10 mass %, and still more preferably from 1 mass % to 3 mass %.

Other Components

The ink composition of the invention may further contain other additives. Examples of such other additives include known additives such as a surfactant, an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Various organic organic anti-fading agents and metal complex anti-fading agents can be used as the anti-fading agents. Examples of the organic anti-fading agent include hydroquinones, alkoxyphenols, dialkoxyphenols, phenols, anilines, amines, indans, chromanes, alkoxy anilines, and heterocycles. Examples of the metal complex include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the ink composition is preferably from 0.02 mass % to 1.00 mass %.

The pH adjuster is not specifically limited as long as the pH adjuster can set a pH value of the ink composition to a desired value without exerting an adverse influence on the ink composition to which the pH adjuster is added. The pH adjuster may be selected appropriately in accordance with the purpose. Examples of the pH adjuster include alcohol amines such as diethanol amine, triethanol amine, or 2-amino-2-ethyl-1,3-propanediol; alkali metal hydroxides such as lithium hydroxide, sodium hydroxide, or potassium hydroxide; ammonium hydroxides such as ammonium hydroxide or quaternary ammonium hydroxide; phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Removing of Organic Solvent

In the removing of the organic solvent performed in the invention, at least a part of the specific organic solvent employed in the invention in the ink composition that has been supplied onto a recording medium, namely, the water-soluble organic solvent having a vapor pressure of less than 10 Pa at 20° C., a boiling temperature of less than 260° C., and an SP value of less than 25. There is no particular limitation on the removing of the organic solvent performed in the invention insofar as at least a part of the specific organic solvent can be removed from the ink composition that has been supplied onto the recording medium in the applying of the ink application. The removal of the organic solvent may more effectively improve rubbing resistance and further suppress occurrence of curling.

Examples of a method of removing at least one part of the specific organic solvent include: a method of heating at least one of the recording medium and the supplied ink composition; a method of exposing the supplied ink composition to drying wind; and a method of placing the recording medium to which the ink composition has been supplied under an reduced pressure environment.

Any generally-used heating methods can be applied to the method of heating at least one of the recording medium and the supplied ink composition without particular limitation. The heating temperature can be typically adjusted to the range from 30° C. to 100° C., and preferably to the range from 40° C. to 70° C.

Any generally-used methods can be applied to the method of exposing the supplied ink composition to drying wind without particular limitation. The quantity of the drying wind is typically adjusted to the range from 1 m$^3$/min to 50 m$^3$/min, and preferably to the range from 3 m$^3$/min to 20 m$^3$/min.

Any generally-used pressure reducing methods can be used for the method of placing the recording medium to which the ink composition has been supplied under an reduced pressure environment without particular limitation. The pressure applied under the reduced pressure environment is adjusted to the range from 100 Pa to 50,000 Pa, and preferably to the range from 1,000 Pa to 10,000 Pa.

While the organic solvent removal in the invention can be performed in any mode as long as it enables to remove at least a part of water-soluble organic solvents from the ink composition supplied onto the recording medium, it is preferable that 70 mass % or more of the water-soluble organic solvent is removed thereby, and it is more preferable that 90 mass % or more of the water-soluble organic solvent is removed thereby. When the amount of the removed water-soluble organic solvent is in such ranges, the occurrence of curling can be more effectively suppressed, and rubbing resistance can be improved.

The temperature, the quantity of drying wind, the pressure applied under the reduced pressure environment, the processing time and the like employed in the solvent removal can be suitably selected according to an amount of the water-soluble organic solvent to be removed.

The organic solvent removal can be performed by using one or a combination of two or more of the exemplified methods. In embodiments, the volatile solvent removal preferably includes the heating method, and more preferably includes both of the heating method and the method of exposing the supplied ink composition to drying wind, from the viewpoint of fixing property and rubbing resistance of an image formed from the ink composition.

Recovering of Solvent

In preferable embodiments, the image forming method of the invention further includes recovering at least a part of the water-soluble organic solvent that has been removed from the ink composition during the removing of the water-soluble organic solvent.

Any generally-used methods can be applied for the solvent recovering without particular limitation insofar as at least a part of the water-soluble organic solvent removed from the ink composition in the organic solvent removal can be recovered. For example, when the removing of the organic solvent includes the heating method and the drying wind-exposing method, the solvent recovering process preferably includes a method of circulating drying wind and a method of cooling the drying wind for condensing and recovering the water-soluble organic solvent.

Supplying of Treatment Liquid

In preferable embodiments, the image forming method of the invention includes, before or after the ink application using the ink composition, supplying a treatment liquid containing at least a coagulation accelerator capable of enhancing coagulation of components in the ink composition (hereinafter sometimes referred to as a "treatment liquid supplying process"), whereby the ink composition and the treatment liquid are brought into contact with each other to form an image on the recording medium. Herein, the pigment in the ink composition aggregates when the treatment liquid contacts the ink composition, and thus the image is fixed onto the recording medium.

The treatment liquid at least contains the coagulation accelerator capable of forming a coagulate when contacting the ink composition, and, as required, can be formed using other components.

Coagulation Accelerator

The treatment liquid contains at least one coagulation accelerator capable of forming a coagulate when contacting the ink composition. When the ink composition and the treatment liquid are mixed on the recording medium, coagulation of the pigments that has been stably dispersed in the ink composition can be enhanced.

The coagulation accelerator in the invention preferably contains at least one selected from a cationic polymer, an acidic compound, and a polyvalent metal salt from the viewpoint of the quality of an image to be formed.

Polymers having a primary-, secondary- or tertiary-amino group or a quaternary ammonium salt group as the cationic group can be preferably used as the cationic polymer.

Preferable examples of the cationic polymer include: polymers that are obtained as a homopolymer of a monomer (cationic monomer) having a primary-, secondary- or tertiary-amino group, salts thereof, or a quaternary ammonium salt group; and polymers that are obtained as a copolymer or a condensation polymer of the cationic monomer and other monomer (hereinafter sometimes referred to as a "non-cationic monomer"). The polymers can be used in any form of a water-soluble polymer or water dispersible latex particles.

Examples of the monomer (cationic monomer) include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride;

trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate;

a substance of N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, or N,N-diethylamino propyl(meth)acrylamide quaternized with methyl chloride, ethyl chloride, methyl bromide, ethyl bromide, methyl iodide or ethyl iodide, and a sulfonate, an alkyl sulfonate, an acetate or an alkyl carboxylate thereof in which an anion therein is substituted.

Specific examples of the cationic monomer include monomethyl diallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethyl ammonium chloride, trimethyl-3-(methacryloyloxy)propyl ammonium chloride, trimethyl-3-(methacryloyloxy)propyl ammonium chloride, trimethyl-2-(methacryloyl amino)ethyl ammonium chloride, triethyl-2-(methacryloyl amino)ethyl ammonium chloride, trimethyl-2-(acryloylamino)ethyl ammonium chloride, triethyl-2-(acryloylamino)ethyl ammonium chloride, trimethyl-3-(methacryloyl amino)propyl ammonium chloride, triethyl-3-(methacryloyl amino)propyl ammonium chloride, trimethyl-3-(acryloylamino)propyl ammonium chloride, triethyl-3-(acryloylamino)propyl ammonium chloride;

N,N-dimethyl-N-ethyl-2-(methacryloyloxy)ethyl ammonium chloride, N,N-diethyl-N-methyl-2-(methacryloyloxy)ethyl ammonium chloride, N,N-dimethyl-N-ethyl-3-(acryloylamino)propyl ammonium chloride, trimethyl-2-(methacryloyloxy)ethylammonium bromide, trimethyl-3-(acryloylamino)propyl ammonium bromide, trimethyl-2-(methacryloyloxy)ethylammonium sulfonate, and trimethyl-3-(acryloylamino)propyl ammonium acetate.

Examples of the monomer which is copolymerizable further include N-vinylimidazole and N-vinyl-2-methylimidazol.

Moreover, allylamine, diallylamine, compounds and salts thereof etc., can be used as the cationic monomer. Examples of such compound include allylamine, allylamine hydrochloride, allylamine acetate, allylamine sulfate, diallylamine, diallylamine hydrochloride, diallylamine acetate, diallylamine sulfate, diallylmethylamine and salts thereof (examples of the salt include hydrochloride, acetate, and sulfate), diallylethylamine and salts thereof (examples of the salts include hydrochloride, acetate, and sulfate), and diallyldimethylammonium salt (examples of counter anion of the salt include chloride, acetate ion, and sulfate ion). Since the allylamine and diallylamine compounds are inferior in polymerization properties in the form of amine, the allylamine and diallylamine compounds are generally polymerized in the form of a salt and are desalted as required.

Moreover, a vinylamine unit formed by polymerizing a unit of N-vinylacetamide or N-vinylformamide followed by hydrolysis and a salt of such a unit can be utilized as the cationic monomer.

The non-cationic monomer refers to a monomer not containing a basic portion or a cationic portion, such as primary-, secondary-, or tertiary-amino groups and salts thereof or a quaternary-ammonium-salt group.

Examples of the non-cationic monomer include alkyl (meth)acrylate; cycloalkyl(meth)acrylate such as cyclohexyl (meth)acrylate; aryl(meth)acrylate such as phenyl(meth) acrylate; aralkyl ester such as benzyl(meth)acrylate; aromatic vinyl such as styrene, vinyltoluene, or α-methyl styrene; vinyl ester such as vinyl acetate, vinyl propionate, or vinyl versatate; allyl ester such as allyl acetate; halogen containing monomers such as vinylidene chloride or vinyl chloride; vinyl cyanide such as (meth)acrylonitrile; and olefin such as ethylene or propylene.

Alkyl(meth)acrylates having an alkyl portion having 1 to 18 carbon atoms are preferable as the alkyl(meth)acrylate. Examples thereof include methyl(meth)acrylate, ethyl(meth) acrylate, propyl(meth)acrylate, isopropyl(meth)acrylate, n-butyl(meth)acrylate, isobutyl(meth)acrylate, t-butyl(meth) acrylate, hexyl(meth)acrylate, octyl(meth)acrylate, 2-ethylhexyl(meth)acrylate, lauryl(meth)acrylate, and stearyl(meth) acrylate.

Among the above, methylacrylate, ethylacrylate, methylmetaacrylate, ethylmethacrylate, and hydroxyethylmethacrylate are preferable.

The non-cationic monomers can be used singly or in combination of two or more thereof.

Preferable examples of the cationic polymer include polydiallyldimethylammonium chloride, polymethacryloyloxyethyl-β-hydroxyethyldimethylammonium chloride, polyethyleneimine, polyallylamine and compounds thereof, polyamide-polyamine resin, cationated starch, a dicyandiamide formalin condensate, a dimethyl-2-hydroxypropyl ammonium salt polymer, polyamidine, polyvinylamine, a dicyan cationic resin typified by a dicyandiamide-formalin polycondensate, a polyamine cationic resin typified by a dicyanamide-diethyltriamine polycondensate, an epichlorohydrin-dimethylamine addition polymer, a dimethyldiallylammonium chloride-SO$_2$ copolymer, a diallylamine salt-SO$_2$ copolymer, a (meth)acrylate-containing polymer having an alkyl group substituted with a quaternary ammonium salt group in an ester portion, and a styryl polymer having an alkyl group substituted with a quaternary ammonium salt group.

Specific examples of the cationic polymer include substances described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, 4,115,124, 4,124,386, 4,193,800, 4,273,853, 4,282,305, and 4,450,224, JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314, JP-B Nos. 5-35162, 5-35163, 5-36164, and 5-88846, JP-A Nos.

7-118333 and 2000-344990, and Japanese Patent Nos. 2648847 and 2661677. Among the above, the diallyldimethylammonium chloride polymer or the (meth)acrylate-containing polymer having a quaternary ammonium salt group in the ester portion are preferable.

Examples of the cationic polymer further include a copolymer formed by copolymerizing at least an epihalohydrin compound and an amine compound.

The cationic polymer employed in the invention is preferably a copolymer formed by copolymerizing at least an epihalohydrin compound and an amine compound from the viewpoint of increasing coagulation rate.

Specific examples of the copolymer formed by copolymerizing at least an epihalohydrin compound and an amine compound include a copolymer of monomethylamine, monoethylamine, dimethylamine, or diethylamine and epichlorohydrin. Copolymers having a molecular weight being further increased by addition of polyalkylene polyamine in addition to alkylamine/epichlorohydrin can be also preferable as the copolymer. Examples of the polyalkylene polyamine include diethylenetriamine, triethylenetetramine, and pentaethylenehexamine.

The weight average molecular weight of the cationic polymer is preferably from about 1000 to about 50000.

The cationic polymers may be used singly or in combination of two or more thereof. The treatment liquid employed in the invention can contain a water-based solvent (e.g., water) in addition to the cationic polymer.

The content of the cationic polymer in the treatment liquid is preferably 5 mass % to 95 mass %, and more preferably 10 mass % to 80 mass %, based on the total amount of the treatment liquid from the viewpoint of coagulation effects.

Examples of the treatment liquid containing an acidic compound include a liquid that can generate a coagulate by changing the pH of the ink composition. Herein, the pH of the treatment liquid at 25° C. is preferably 3.5 or lower, more preferably in the range of from 0.5 to 2.5, and still more preferably in the range of from 0.5 to 1.5, from the viewpoint of the coagulation rate of the ink composition. Herein, the pH of the ink composition used in the jetting process at 25° C. is preferably 7.5 or more, and more preferably 8 or more.

In particular, in preferable embodiments, the pH of the ink composition at 25° C. is 8 or more and the pH of the treatment liquid at 25° C. is 3.5 or lower (preferably from 0.5 to 2.5) from the viewpoint of improvements in image density and image resolution, and increasing ink jet recording rate.

The components for the coagulation can be used singly or in combination of two or more.

The treatment liquid can be formed as the coagulation accelerator by using at least one acidic compound. Examples of the acidic compound include compounds having a phosphate group, a phosphonic acid group, a phosphinic acid group, a sulfuric acid group, a sulfonic acid group, a sulfinic acid group, or a carboxyl group, or salts thereof (e.g., polyvalent metal salts). Among the above, from the viewpoint of the coagulation rate of the ink composition, the compounds having a phosphonic acid group or a carboxyl group are more preferable, and the compounds having a carboxyl group are still more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyronecarboxylic acid, pyrrolecarboxylic acid, furancarboxylic acid, pyridinecarboxylic acid, coumalic acid, thiophenecarboxylic acid, nicotinic acid, modified compounds thereof, and salts thereof (e.g., polyvalent metal salts). These compounds may be used singly or in combination of two or more thereof.

The content of the acidic compound in the treatment liquid is preferably from 5 mass % to 95 mass %, and more preferably from 10 mass % to 80 mass %, with respect to the total amount of the treatment liquid from the viewpoint of the coagulation effects.

One preferable example of the treatment liquid that improves high-speed coagulation properties include a treatment liquid to which a polyvalent metal salt is added. Examples of the polyvalent metal salt include alkaline earth metals of the second group of the periodic table (e.g., magnesium and calcium), the transition metals of the third group of the periodic table (e.g., lanthanum), cation of the 13th group of the periodic table (e.g., aluminum), and salts of lanthanides (e.g., neodymium). Carboxylate (formic acid, acetic acid, benzoate, etc.), nitrate, chloride, and thiocyanate are preferable as the salts of metals. Among the above, calcium salts or magnesium salts of carboxylic acid (formic acid, acetic acid, benzoate, etc.), calcium salts or magnesium salts of nitric acid, calcium chloride, magnesium chloride, and calcium salts or magnesium salts of thiocyanic acid are preferable.

The content of the salts of metals in the treatment liquid is preferably in the range of 1 mass % to 10 mass %, more preferably in the range of 1.5 mass % to 7 mass %, and still more preferably in the range of 2 mass % to 6 mass %.

The viscosity of the treatment liquid is preferably in the range of 1 mPa·s to 30 mPa·s, more preferably in the range of 1 mPa·s to 20 mPa·s, still more preferably in the range of 2 mPa·s to 15 mPa·s, and particularly preferably in the range of 2 mPa·s to 10 mPa·s from the viewpoint of the coagulation rate of the ink composition. The viscosity is measured under the conditions of a temperature of 20° C. using VISCOMETER TV-22 (trade name, manufactured by TOKI SANGYO CO. LTD).

The surface tension of the treatment liquid is preferably 20 mN/m to 60 mN/m, more preferably 20 mN/m to 45 mN/m, and still more preferably 25 mN/m to 40 mN/m from the viewpoint of the coagulation rate of the ink composition.

The surface tension is measured under the conditions of a temperature of 25° C. using AUTOMATIC SURFACE TENSIOMETER CBVP-Z (trade name, manufactured by Kyowa Interface Science Co., LTD.).

In preferable embodiments, applying of the ink composition is performed after the applying of the treatment liquid. More specifically, in preferable embodiments, a treatment liquid for coagulating components in the ink composition (particularly, particles contained in the ink composition such as a pigment) is supplied beforehand onto the recording medium before the ink composition is supplied, and then the ink composition is supplied so as to contact the treatment system supplied onto the recording medium to form an image. The embodiments may enable increasing an ink jet recording rate and providing an image having a high concentration and a high resolution even when high-speed recording is performed.

In embodiments, the ink jet recording method of one aspect of the invention may employ an intermediate transfer body as an a recording medium on which an image is to be recorded first. Namely, in embodiments, the ink jet recording method of one aspect of the invention include: applying, onto an intermediate transfer body, the ink composition employed in the invention, by an ink jet method, accompanied with removing an organic solvent; applying, onto the intermediate transfer body, a treatment liquid capable of forming a coagulate on the intermediate transfer body when contacting the ink composition, so as to have the ink composition and the treatment liquid are brought into contact with each other to form an image on the intermediate transfer body; and transferring the thus-formed image on the intermediate transfer body to a recording medium desired as a final recorded media. Also in this case, the jetting of the ink composition may be performed after the application of the jetting of the treatment liquid.

EXAMPLES

Hereinafter, the invention will be described in more detail with reference to examples, although the invention is not limited to the examples. "Parts" indicates quantity in terms of mass, unless otherwise specified.

The weight average molecular weight of the resin was herein measured by gel permeation chromatography (GPC). In the GPC, the measurement is carried out by the use of HLC-8020GPC (trade name, manufactured by Tosoh Corporation), three columns of TSK GEL, SUPER MULTIPORE HZ-H (trade name, manufactured by Tosoh Corporation; 4.6 mmID×15 cm) as columns, and THF (tetrahydrofuran) as an elute. The measurement was performed using an IR detector under the conditions of a sample concentration of 0.35/min., a flow rate of 0.35 ml/min., an injection amount of sample of 10 μl, a measurement temperature of 40° C. Calibration curves was prepared by eight samples of "REFERENCE SAMPLE TSK STANDARD, POLYSTYRENE" of "F-40", "F-20", "F-4", "F-1", "A-5000", "A-2500", "A-1000" and "n-propylbenzene" (all trade names, manufactured by Tosoh Corporation).

Example 1

Preparation of Ink

Synthesis of Polymer Dispersant P-1

A polymer dispersant P-1 was synthesized according to the following scheme.

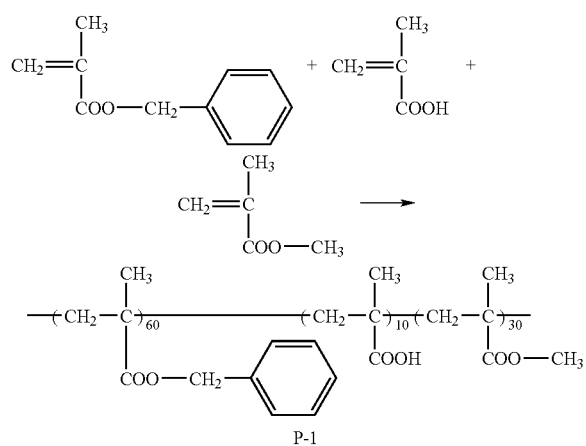

P-1

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a solution. The solution is added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at this temperature for 4 hours. The obtained reaction solution was reprecipitated twice with an excess quantity of hexane, and the precipitated resin was dried to obtain 96 g of the polymer dispersant P-1.

The formulation of the obtained resin was identified with $^1$H-NMR. The weight average molecular weight (Mw) was determined by a GPC method, and was found to be 44,600. Furthermore, the acid value of the polymer was obtained in accordance with the method described in JIS Standard (JIS-K0070 (1992), the disclosure of which is incorporated by reference herein), and was found to be 65.2 mgKOH/g.

Dispersion of Pigment-Containing Resin Particles 10 parts by mass of pigment blue 15:3 (trade name: PHTHALOCYANINE BLUE A220, manufactured by Dainichiseika Color & Chemicals Mfg. Co., Ltd.), 5 parts by mass of the polymer dispersant P-1, 42 parts by mass of methyl ethyl ketone, 5.5 parts of an aqueous solution of NaOH (1 mol/L), and 87.2 parts of ion-exchanged water were mixed, and the mixture was dispersed with a bead mill for 2 to 6 hours using zirconia beads with a diameter of 0.1 mm.

Methyl ethyl ketone was removed from the obtained dispersion at 55° C. under reduced pressure, and a part of the water was removed, whereby a dispersion containing pigment-containing resin particles with a pigment concentration of 10.2 mass % was obtained.

Synthesis and Preparation of Self-Dispersible Polymer Particles

Synthesis of Self-Dispersible Polymer Particles B-1

360.0 g of methyl ethyl ketone was placed in a 2 L three necked flask equipped with a stirrer, a thermometer, a reflux condenser tube, and a nitrogen gas introducing pipe, and the temperature was raised to 75° C. Thereafter, while maintaining the temperature inside the flask at 75° C., a mixed solution containing 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Ind. Ltd.) was added dropwise at a constant rate so that the dropwise addition was completed in 2 hours. After completion of the dropping, a solution containing 0.72 g of V-601 (described above) and 36.0 g of methyl ethyl ketone was added, and stirred at 75° C. for 2 hours. Further, a solution containing 0.72 g of V-601 (described above) and 36.0 g of isopropanol was added, and stirred at 75° C. for 2 hours. Thereafter, the temperature was raised to 85° C., and the stirring was continued for further 2 hours, thereby obtaining a resin solution of a phenoxy ethyl acrylate/methyl methacrylate/acrylic acid (=50/45/5 [mass ratio]) copolymer.

The weight average molecular weight (Mw) of the obtained copolymer was 64,000 (calculated by gel permeation chromatography (GPC) in terms of polystyrene) and the acid value was 38.9 (mgKOH/g).

Next, 668.3 g of the obtained resin solution was weighed, and 388.3 g of isopropanol and 145.7 ml of aqueous 1 mol/L NaOH solution were added. Then, the temperature inside the reactor was raised to 80° C. Next, 720.1 g of distilled water was added dropwise at a rate of 20 ml/min so that the copolymer resin is dispersed in water. Thereafter, the resultant was held under an atmospheric pressure at a temperature inside the reactor of 80° C. for 2 hours, and then maintained at 85° C. for 2 hours, and then further maintained at 90° C. for 2 hours. Then, the pressure inside the reactor was reduced, and the isopropanol, methyl ethyl ketone, and distilled water were distilled off in the total amount of 913.7 g, to provide a water dispersion of the self-dispersible polymer particles B-1 having a solid content of 28.0 mass %.

Preparation of Cyan Ink C-1

A cyan ink C-1 was prepared to have the following formulation by using the dispersion of resin-coated pigment particles and the water dispersion of the self-dispersible polymer particles B-1, and further using a hydrophilic organic solvent, a surfactant, and ion exchange water.

Formulation of Cyan Ink C-1

Cyan pigment (pigment·blue 15:3) 4 mass %
Polymer dispersant P-1 2 mass %
Water dispersion of Self-dispersible polymer particles B-1
 (solid content) 8 mass %
Diethylene glycol monobutyl ether
 (DEGmBE; SP value: 21.2; volatile pressure at 20° C.: 3 Pa; water-soluble organic solvent employable in the invention) 5 mass %
Polypropylene Glycol
 (trade name: SUNNIX GP250, GP250 manufactured by Sanyo Chemical Industries, Ltd.; boiling temperature: 285° C. or more; volatile pressure at 20° C.: lower than 10 Pa) 10 mass %
OLFINE E1010
 (trade name, manufactured by Nissin Chemical Industry, Inc., Surfactant) 1 mass %
Ion exchange water balance (to adjust the total amount of the composition to 100 parts)

Evaluation 1

Evaluation of Stability of Ink Composition

The particle diameter and the viscosity of the cyan ink C-1 obtained above were measured at the time immediately after the preparation thereof as well as at the time when 14 days passed after storing the ink composition in a thermostat oven at 60° C. The ink composition was evaluated under the following conditions. The results are shown in Table 2.

(1) Whether a change in particle diameter is within 10 nm of the initial particle diameter (2) Whether a change in viscosity is within 10% of the initial viscosity Evaluation Criteria A: Both conditions (1) and (2) are satisfied;
B: Either condition (1) or (2) is satisfied;
X: Neither condition (1) nor (2) is satisfied.

Measurement of Diameter of Particles

The volume average particle diameter of the obtained pigment dispersion was measured by a dynamic light scattering method using NANOTRAC particle size distribution measuring device UPA-EX150 (trade name, manufactured by Nikkiso Co., Ltd.). A test solution was prepared by adding 10 ml of ion-exchanged water to 10 μl of the aqueous ink composition, and subjected to the measurement at 25° C.

Measurement of Viscosity

The viscosity of the aqueous ink composition was measured using VISCOMETER TV-22 (trade name, manufactured by Toki Sangyo Co., Ltd.) at 25° C.

Preparation of Treatment Liquid

A treatment liquid was prepared by mixing components to have the following formulation. The viscosity, surface tension, and pH (25±1° C.) of the treatment liquid were measured to turn out to be 4.9 mPa·s, 24.3 mN/m, and 1.5, respectively. The measurement of the viscosity was performed by the same method as above. The measurement of the surface tension was performed under the conditions of a temperature of 25° C. using an automatic surface tensiometer CBVP-Z (trade name, manufactured Kyowa Interface Science Co., LTD.). The pH was measured at 25±1° C.

Formulation of Treatment Liquid

| | |
|---|---|
| Dimethylamine/Epichlorohydrin copolymer (Polymerization ratio 1:1, Weight average molecular weight 6000) | 5 mass % |
| Diethylene glycol monoethyl ether (manufactured by Wako Pure Chemical Ind. Ltd.) | 20.0 mass % |
| ZONYL FSN-100 (trade name, manufactured by DuPont) | 1.0 mass % |
| Ion exchange water | 74 mass % |

Image Formation and Evaluation

A sheet of TOKUBISHI ART RYOMEN N (trade name, manufactured by Mitsubishi Seishi Co., basis weight: 84.9 g/m$^2$) was placed in a fixing manner on a stage which is transferable in a predetermined direction at 500 mm/sec. The treatment liquid was coated onto the sheet with a wire bar coated so as to make the thickness of the coated film be about 5 μm, and the coated film is subjected to drying at 50° C. for 2 seconds immediately after the coating, so as to provide an image recording medium.

DIMATIX MATERIAL PRINTER DMP-2831 (trade name, manufactured by Fuji Film Dimatix Inc.) that was equipped with a 10 pl ejection cartridge formed by modifying DMC-11610 (trade name, manufactured by Fuji Film Dimatix Inc.) to allow liquid supply from the outside was used as an inkjet recording apparatus. A solid image was printed with the cyan ink C-1 on the recording medium in an ink coating amount of 5 g/m$^2$ (process of application of ink composition). Volatile solvent was removed from the thus-obtained printed sample by heating at 60° C. for 3 minutes to provide a sample for evaluation (process of removal of organic solvent). The sample was subjected to the following evaluations.

The removed solvent was adsorbed by an adsorbent, and a container in which the adsorbent that had adsorbed the solvent was accommodated was supplied with a carrier gas and simultaneously depressurized, thereby releasing the solvent as a gas into the carrier gas, and the solvent was separated from the carrier gas, then concentrated and simultaneously cooled to recover the condensed solvent (process of recovery).

Evaluation 2

Evaluation of Curling Property

A solid image was printed with the ink composition on the recording medium in an ink coating amount of 5 g/m$^2$, and then a strip having a size of 5 mm×50 mm was cut out of the recording medium such that the length direction of the strip is in the direction of curl, and the strip was allowed to stand for 24 hours at either (1) at a temperature of 30° C. and a relative humidity of 80% or (2) at a temperature of 25° C. and a relative humidity of 50%. Then, a curling behavior (curl value) of the sample was measured and evaluated according to the following criteria. The evaluation results are shown in Table 2.

Method of Measuring Curvature:

The sample strip having a size of 5 mm×50 mm, the length of 50 mm being in the curling direction, was measured with a curl measurement plate, and a curl value (C) was read. The curl of the sample was regarded as an arc of a circle with a radius of R, and the curl was calculated according to the equation of $C=1/R(m)$.

Evaluation Criteria:

A: Curvature C does not exceed 10.

AB: Curvature C is larger than 10 and is equal to or smaller than 15.

B: Curvature C is larger than 15 and is equal to or smaller than 20.

X: Curvature C exceeds 20.

Evaluation of Rubbing Resistance

Unprinted sheet of TOKUBISHI ART (described above) was cut into 10 mm×50 mm and used to wrap around a paperweight (weight: 470 g, size: 15 mm×30 mm×120 mm) so as to make a contact area of the cut sheet of the unprinted TOKUBISHI ART (described above) and a sample to be evaluated be 150 mm². The printed sample for evaluation prepared for the evaluation of curling property was rubbed with the wrapped paperweight back-and-forth three times, the load applied to the sample by this operation being equivalent to 260 kg/m². The printed surface of the sample after being rubbed was visually observed, and rubbing resistance of the sample was evaluated according to the following evaluation criteria.

Evaluation Criteria:

A: No peeling (separation) of the image (color material) from the printed surface was visually observed.

B: Practically tolerable, although a slight degree of separation of the image (color material) from the printed surface was visually observed.

X: Practically problematic. Separation of the image (color material) from the printed surface was clearly observed.

Evaluation of Jetting Stability

Having jetting the cyan ink C-1, evaluations with respect to the following evaluation items were performed and whether the evaluation items were satisfied or not were judged in the following manner. Image irregularity of printed images was visually observed by naked eyes. The evaluation results are shown in Table 2. Jet ratio is defined as "(number of nozzles which performed jetting)/(number of all nozzles)×100(%)".

Evaluation Items:

(1) Jet ratio observed after continuous jetting for 60 minutes is 90% or more.

(2) Jet ratio observed after posing for 30 minutes succeeding to jetting for one minute is 90% or more.

(3) Image irregularity is not observed in the solid image

Evaluation Criteria:

A: Satisfactory in all the three items.

B: Unsatisfactory in one or more among the three items.

Image Quality (Avoidance of Interference Between Jetted Droplets)

The sample having a printed image with a size of 5 cm×5 cm was dried, and was fixed by heating at 100° C. for 10 seconds. Thereafter, the image quality (avoidance of interference between jetted droplets) was evaluated according to the following evaluation criteria.

Evaluation Criteria

A: No image unevenness was visually observed.

B: Practically tolerable, although a slight degree of image unevenness was visually observed.

X: Practically problematic. Image unevenness was clearly visually observed.

Maintainability

The cyan ink C-1 was jetted from a nozzle surface of an ink jet head, and then wiping of the nozzle surface was performed by a wiper blade formed of hydrogenated NBR. The jetting and the wiping were performed under each of the conditions (1) to (3), and whether the re-jetting property of the ink is satisfactory or not was judged based on the results of the re-jetting. Subsequently, maintainability was evaluated according to the following evaluation criteria. The results are shown in Table 2.

(1) When the ink jetting ratio, which was measured after performing blade wiping once immediately after completion of continuous jetting of the ink over 60 minutes, was 90% or more, the ink was evaluated as being satisfactory with respect to the condition (1).

(2) When the ink jetting ratio, which was measured after performing blade wiping once at 30 minutes after stopping jetting of the ink continued over 1 minute, was 90% or more, the ink was evaluated as being satisfactory with respect to the condition (2).

(3) When no unevenness was observed in an image formed after blade wiping was performed once immediately after completion of continuous jetting of an ink over 10 minutes, the ink was evaluated being satisfactory with respect to the condition (3).

Measurement of Ink Jetting Ratio

All the nozzles were confirmed as being jetting ink when the experiments were started. Then, the number of jetting nozzles after completion of the experiments including the maintenance process was counted, and the jetting ratio was calculated as follows.

Jetting ratio(%)=(Number of nozzles capable of jetting after maintenance)/(number of all nozzles)× 100

Evaluation Criteria

A: Satisfactory in three conditions

B: Satisfactory in two conditions

C: Satisfactory in one condition

X: Unsatisfactory in three conditions

Examples 2 to 8 and Comparative Examples 1 to 5

An ink composition and a treatment liquid of Examples 2 to 8 and Comparative examples 1 to 5 were prepared in the similar manner as those in Example 1, except that the amount and the kind of the solvent, the polymer particle, the coagulant in the treatment liquid, and the inclusion or absence of the removing of the organic solvent involved in the preparation of the cyan ink C-1 were changed to those shown in Table 1.

Image formation and evaluations were performed in the similar manner as Example 1, except that the thus-prepared ink composition and treatment liquid were employed. The results thereof are shown in Table 2.

Herein, a non-dispersible polymer particle PL-01 was prepared in the following manner, and the treatment liquid containing a polyvalent metal salt and employed in Example 3 was prepared to have the formulation shown below.

Preparation of Polymer Particle PL-01

19.8 g of LATEMUL ASK (trade name, manufactured by Kao Corp.; carboxylate emulsifier), 6 g of aqueous 5 mol/L sodium hydroxide solution, and 0.3 g of 2,2'-azobis(2-amidinopropane)dihydrochloride were added to 120 g of water and uniformly dissolved. The mixture was heated to 70° C., and a monomer mixture of 25.9 g of styrene, 26.3 g of butyl acrylate, and 5.1 g of acrylic acid was added thereto over 2 hours under nitrogen flow. Thereafter, the resultant was heated at 70° C. for 2 hours, and further heated at 80° C. for 3 hours. The resultant was cooled to room temperature. Then, an aqueous 1 mol/L sodium hydroxide solution was added to the resultant while stirring so as to adjust the pH thereof to about 9, so as to provide a latex (polymer particle dispersion)

PL-01. The volume average particle diameter of the obtained latex was 115 nm. The solid content of the latex was 33 mass %.

Composition of Treatment Liquid Containing Polyvalent Metal Salt

| | |
|---|---|
| Calcium nitrate tetrahydrate | 18 parts |
| 1,2,6-Hexanetriol | 13 parts |
| 1,5-Pentadiol | 7 parts |
| Glycerin | 5 parts |
| acetylene glycol surfactant (trade name: ACETYLENOL EH, manufactured by Kawaken Fine Chemicals Co., Ltd.) | 1 part |
| Ion-exchanged water | 56 parts |

TABLE 1

| | Solvent | Boiling temperature | SP value | Vapor pressure [Pa at 20° C.] | Amount of Solvent [mass %] | Percentage in total organic solvent [%]*1 | Percentage of solvent having SP value less than 27.5% [%]*2 | Polymer particles | Aggregation accelerator | Removal of Organic solvent |
|---|---|---|---|---|---|---|---|---|---|---|
| Example 1 | GPS250 | ≥285° C. | 26.4 | <10 | 10 | 33.3 | 100 | Self-dispersible B-1 | Cation polymer | performed |
| | DEGmBE | 230° C. | 21.1 | 3 | 5 | | | | | |
| Example 2 | GPS250 | ≥285° C. | 26.4 | <10 | 10 | 33.3 | 100 | Non-self-dispersible PL-01 | Cation polymer | performed |
| | DEGmBE | 230° C. | 21.2 | 3 | 5 | | | | | |
| Example 3 | GPS250 | ≥285° C. | 26.4 | <10 | 10 | 33.3 | 100 | Self-dispersible B-1 | Polyvalent metal salt | performed |
| | DEGmBE | 230° C. | 21.2 | 3 | 5 | | | | | |
| Comp. Example 1 | GPS250 | ≥285° C. | 26.4 | <10 | 10 | 33.3 | 100 | Non-self-dispersible PL-01 | Cation polymer | omitted |
| | DEGmBE | 230° C. | 21.2 | 3 | 5 | | | | | |
| Example 4 | GPS250 | ≥285° C. | 26.4 | <10 | 10 | 50 | 100 | Self-dispersible B-1 | Acid | performed |
| | TEGmEE | 246° C. | 21.2 | 1.33 | 10 | | | | | |
| Example 5 | GPS250 | ≥285° C. | 26.4 | <10 | 8 | 55.6 | 100 | Self-dispersible B-1 | Cation polymer | performed |
| | TPGmEE | 255° C. | 21.7 | 0.3 | 10 | | | | | |
| Example 6 | GPS250 | ≥285° C. | 26.4 | <10 | 8 | 42.9 | 100 | Self-dispersible B-1 | Cation polymer | performed |
| | DEGmEE | 243° C. | 20.4 | 4 | 6 | | | | | |
| Comp. example 2 | GPS250 | ≥285° C. | 26.4 | <10 | 10 | 33.3 | 100 | Self-dispersible B-1 | Acid | performed |
| | DEGmEE | 202° C. | 22.4 | 13 | 5 | | | | | |
| Comp. example 3 | GPS250 | ≥285° C. | 26.4 | <10 | 10 | 33.3 | 100 | Self-dispersible B-1 | Acid | performed |
| | TEGmBE | 280° C. | 21.1 | 1 | 5 | | | | | |
| Comp. example 4 | 1,2-hexanediol | 224° C. | 24.1 | 8 | 6 | 28.6 | | Non-self-dispersible PL-01 | absent | performed |
| | 5-pyrrolidone | 245° C. | 25.9 | 2.7 | 6 | | | | | |
| | DPG | 245° C. | 27.1 | 1.3 | 5 | | | | | |
| | DEG | 232° C. | 30.6 | 2.7 | 4 | | | | | |
| Example 7 | GPS250 | ≥285° C. | 26.4 | <10 | 10 | 33.3 | 100 | Non-self-dispersible PL-01 | absent | performed |
| | TPGmME | 243° C. | 20.4 | 4 | 5 | | | | | |
| Comp. example 5 | GPS250 | ≥285° C. | 26.4 | <10 | 10 | 33.3 | 100 | absent | absent | performed |
| | TPGmME | 243° C. | 20.4 | 4 | 5 | | | | | |
| Example 8 | GPS250 | ≥285° C. | 26.4 | <10 | 10 | 33.3 | 100 | Self-dispersible B-1 | Cation polymer | performed |
| | | 224° C. | 24.1 | 8 | 5 | | | | | |

GP250: NEW POLE GP250 (polyoxypropylene glyceryl ether), trade name, manufactured by Sanyo Chemical Industries, Ltd.

*1Content ratio of "the water-soluble organic solvent having a vapor pressure of less than 10 Pa at 20° C., a boiling point of less than 260° C. and an SP value of less than 25"

*2Content ratio of "the organic solvent having an SP value of less than 27.5 in the nonvolatile water-soluble organic solvent

TABLE 2

| | Ink stability | Rubbing resistance | Curing at high temperature and high humidity (30° C., 80%) | Curling at ambient temperature and ambient humidity (25° C., 50%) | Jetting stability | Image quality (interference avoidance) | Maintainability |
|---|---|---|---|---|---|---|---|
| Example 1 | A | A | A | A | A | A | A |
| Example 2 | B | B | AB | A | A | A | A |
| Example 3 | A | A | A | A | A | A | A |
| Comp. example 1 | B | X | X | X | A | A | A |
| Example 4 | A | A | A | A | A | A | A |
| Example 5 | A | A | A | A | A | A | A |
| Example 6 | A | A | A | A | A | A | A |
| Comp. example 2 | A | A | A | A | B | A | C |

TABLE 2-continued

| | Ink stability | Rubbing resistance | Curing at high temperature and high humidity (30° C., 80%) | Curling at ambient temperature and ambient humidity (25° C., 50%) | Jetting stability | Image quality (interference avoidance) | Maintainability |
|---|---|---|---|---|---|---|---|
| Comp. example 3 | A | A | X | B | A | A | A |
| Comp. example 4 | X | B | B | B | B | X | C |
| Example 7 | B | B | AB | A | A | B | A |
| Comp. example 5 | A | X | AB | A | A | X | A |
| Example 8 | A | A | B | A | A | A | A |

Details of the abbreviations of the names of solvents shown in Table 1 are as follows.
TEGmME: Triethylene glycol monomethyl ether
TEGmEE: Triethylene glycol monoethyl ether
TPGmME: Tripropylene glycol monomethyl ether
DEGmEE: Diethylene glycol monoethyl ether
TEGmBE: Triethylene glycol monobutyl ether
DPG: Dipropylene glycol
DEG: Diethylene glycol It is understood from Tables 1 and 2 that the embodiments of the image forming method of the invention exhibit excellent stability and jetting property of the ink composition and provide high quality images without unevenness. The embodiments of the image forming method of the invention further exhibit excellent maintenancability to suppress curling under high temperature and high humidity.

What is claimed is:
1. An image forming method comprising:
applying, onto a recording medium, an ink composition comprising a water-soluble organic solvent comprising a first water-soluble organic solvent and a second non-volatile water-soluble organic solvent, a pigment, a polymer particle and water; and
removing at least a part of the first water-soluble organic solvent from the ink composition on the recording medium,
the first water-soluble organic solvent having a vapor pressure of less than 10 Pa at 20° C., a boiling temperature of less than 260° C., and an SP value of less than 25, at a content of 30 mass % or more with respect to the total water-soluble organic solvent content of the ink composition, wherein the first water-soluble organic solvent is a monoalkyl ether compound of polyalkylene glycol; and
the second non-volatile water-soluble organic solvent comprising at least one selected from the group consisting of

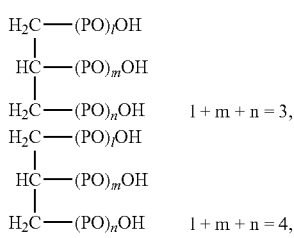

$l + m + n = 3$,

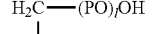

$l + m + n = 4$,

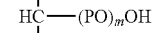

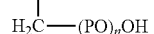

$l + m + n = 5$,

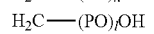

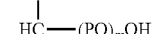

$l + m + n = 6$,

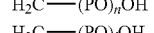

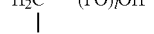

$l + m + n = 7$, $HO(A'O)_{40}$—H, wherein each A'O is EO or PO and a ratio EO:PO in $(A'O)_{40}$ is 1:3,
$HO(A''O)_{55}$—H, wherein each A''O is EO or PO and a ratio EO:PO in $(A''O)_{55}$ is 5:6,
$HO(PO)_3$—H and
$HO(PO)_7$—H,
wherein EO represents an ethyleneoxy group, and PO represents a propyleneoxy group.

2. The image forming method of claim 1, wherein the polymer particle comprises a self-dispersible polymer particle.

3. The image forming method of claim 1, wherein the total content of one or more second non-volatile water-soluble organic solvents having an SP value of less than 27.5 is 90% by mass or more with respect to the total content of the non-volatile water-soluble organic solvent.

4. The image forming method of claim 1, further comprising supplying a treatment liquid comprising a coagulation accelerator capable of enhancing coagulation of components in the ink composition.

5. The image forming method of claim 4, wherein the coagulation accelerator comprises at least one selected from the group consisting of a cationic polymer, an acidic compound, and a polyvalent metal salt.

6. The image forming method of claim 4, wherein the coagulation accelerator comprises a cationic polymer, and the cationic polymer is formed by copolymerizing at least an epihalohydrin compound and an amine compound.

7. The image forming method of claim 1, wherein the pigment is a water-dispersible pigment, and at least a portion of a surface of the pigment is covered with a water-insoluble resin.

8. The image forming method of claim 7, wherein:
40 mass % or more of the total amount of the water-insoluble resin is formed of a hydrophobic structural unit which has an aromatic ring which is linked, through a linking group, to an atom which forms the main chain of the water-insoluble resin;

15 mass % or more of the total amount of the water-insoluble resin is formed of a hydrophobic structural unit derived from an acrylic or methacrylic acid ester of an alkyl having 1 to 4 carbon atoms in the alkyl group; and 15 mass % or less of the total amount of the water-insoluble resin is formed of a hydrophilic structural unit derived from at least one of acrylic acid and methacrylic acid.

9. The image forming method of claim 1, further comprising recovering at least a part of the first water-soluble organic solvent removed in the removing of the first water-soluble organic solvent.

10. The image forming method of claim 1, wherein the polymer particle comprises a self-dispersible polymer particle which is dispersed in the ink composition in the absence of a surfactant.

11. The image forming method of claim 1, wherein the polymer particle comprises a self-dispersible polymer particle comprising a water-insoluble polymer comprising a hydrophilic structural unit and a structural unit derived from aromatic group-containing (meth)acrylate monomer.

* * * * *